United States Patent [19]

Uchida et al.

[11] Patent Number: 5,050,083

[45] Date of Patent: Sep. 17, 1991

[54] SYSTEM AND METHOD FOR CONTROLLING AIR/FUEL MIXTURE RATIO FOR INTERNAL COMBUSTION ENGINE

[75] Inventors: Masaaki Uchida; Hideki Uema; Fumio Yukawa; Kunifumi Sawamoto; Toyaki Nakagawa; Naoki Nakada, all of Kanagawa, Japan

[73] Assignee: Nissan Motor Company, Limited, Yokohama, Japan

[21] Appl. No.: 414,002

[22] Filed: Sep. 29, 1989

[30] Foreign Application Priority Data

| | | | |
|---|---|---|---|
| Sep. 29, 1988 | [JP] | Japan | 63-245805 |
| Dec. 9, 1988 | [JP] | Japan | 63-160181[U] |
| Dec. 9, 1988 | [JP] | Japan | 63-311355 |
| Dec. 13, 1988 | [JP] | Japan | 63-314760 |

[51] Int. Cl.⁵ .................. G06F 15/48; F02M 51/00; F02M 41/00; G06G 7/70

[52] U.S. Cl. .................. 364/431.05; 364/431.01; 123/440; 123/443; 123/489

[58] Field of Search .................. 364/431.05, 431.04, 364/431.03, 426.04, 431.01; 123/440, 443, 480, 489

[56] References Cited

U.S. PATENT DOCUMENTS

| | | | |
|---|---|---|---|
| 4,535,736 | 8/1985 | Taura et al. | 364/431.05 |
| 4,763,627 | 8/1988 | Tomisawa | 123/440 |
| 4,878,472 | 11/1989 | Hibino | 123/489 |
| 4,881,505 | 11/1989 | Tomisawa | 123/489 X |
| 4,884,547 | 12/1989 | Tamura | 123/489 |
| 4,926,826 | 5/1990 | Nakaniwa et al. | 123/489 |

*Primary Examiner*—Parshotam S. Lall
*Assistant Examiner*—E. Pipala
*Attorney, Agent, or Firm*—Foley & Lardner

[57] ABSTRACT

A system and method for controlling an air/fuel mixture for an internal combustion engine are disclosed in which an integration constant used for a calculation of an integration portion included in a feedback correction coefficient (α) of the air/fuel mixture ratio after a relationship between an actual air/fuel mixture raito and target (stoichiometric) air/fuel mixture ratio has been inverted is set and varied according to an engine driving condition, so that the integration constant meets requirements of a stability during an engine steady driving condition and a favorable responsive characteristic during an engine transient condition. In a preferred embodiement, a fuzzy control is applicable to the calculation of the integration constant.

36 Claims, 23 Drawing Sheets

FIG.14
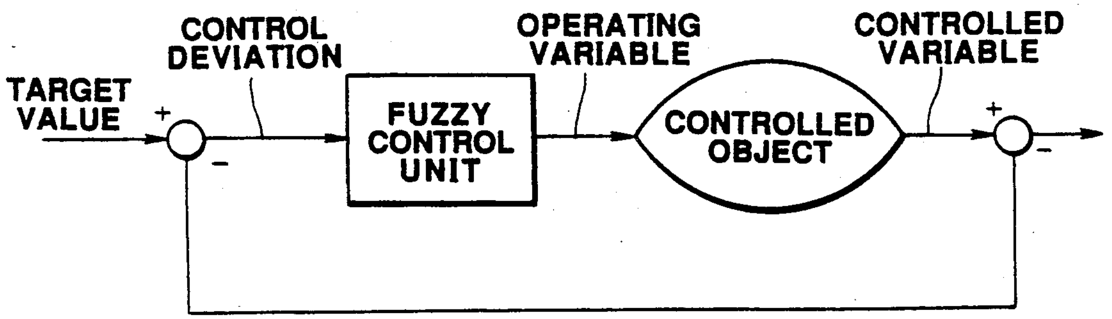
FIG.15
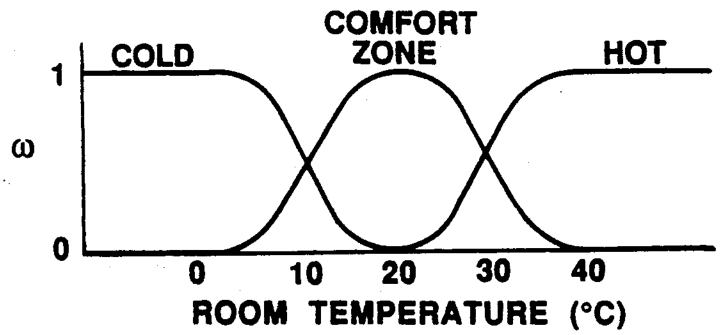
FIG.16
| | COLD | COMFORT ZONE | HOT |
|---|---|---|---|
| OPERATION OF KNOB | OPEN 5° | NOTHING IS DONE | CLOSE 5° |

| INPUT MEMBERSHIP FUNCTION | STEADY STATE | TRANSIENT STATE | TRANSIENT STATE END |
|---|---|---|---|
| OUTPUT MEMBERSHIP FUNCTION | D2 | D3 | D4 |

SYSTEM AND METHOD FOR CONTROLLING AIR/FUEL MIXTURE RATIO FOR INTERNAL COMBUSTION ENGINE

BACKGROUND OF THE INVENTION

1. Field of the Invention

The present invention relates generally to a system and method for controlling an air/fuel mixture ratio for an internal combustion engine and particularly relates to a system and method which detects the air/fuel mixture ratio from the exhaust gas of the engine to carry out feedback control of the air/fuel mixture ratio on the basis of the detected signal thereof so that the air/fuel mixture ratio of the air fuel mixture supplied to the engine reaches a target air/fuel mixture ratio (so called, stoichiometric air/fuel mixture ratio) on the basis of the detected result of the air/fuel mixture ratio from the exhaust gas.

2. Description of the Background Art

Fuel injection systems using microcomputers have been developed which exhibit excellent performance which is superior to carburetor systems. In addition, the high control accuracy of air/fuel mixture ratios provided by fuel injection systems completely coincide with requirements for technologies for suppressing harmful components in exhaust gas which are strictly regulated.

One of advantages of the fuel injection system is that a great number of components can be miniaturized although control components have multi-functions. One of the other advantages of the fuel injection system is that if a program is prepared and stored according to the desired control functions, its functions can be freely expanded. Program modifications can be made with the computer hardware itself remaining unchanged. In addition, since the data required for control can be stored, optimal system control as obtained in testing laboratories can be achieved without compromise. This results in high performance engine control. (Refer to pages 28 through 40 of "Automotive Engineering" published by Tetsudo Nippon Sha on October, 1985, and pages 108 through 114 of the same title published on January, 1986, and pages 47 through 56 of "Car Electronics" published by Kabushiki Kaisha Okawa Shuppan, authorized by Youichi Hayashida.)

The above pertains particularly to fuel injection control. A microcomputer calculates the most appropriate injection quantity in accordance with the program stored in memory in response to input signals derived from various types of sensors. The most appropriate injection quantity is injected into an intake manifold at the timing during which power is supplied to the solenoid coil of the fuel injection valve corresponding to the injection quantity.

The injection duration for normal engine operation is once per engine revolution for all cylinders, when fuel is injected through all fuel injection valves simultaneously. A reference position signal is produced from a crank angle sensor (120° signal in the case of six-cylinder engine). In other words, a drive pulse is output to the injection valve at equal intervals for three inputs of the 120° signal in the case of a six-cylinder engine.

The injection quantity of fuel includes a "basic injection quantity plus various correction quantities".

However, since fuel pressure acting on the fuel injection valves is held constant, the injection quantity corresponds to a pulsewidth supplied to each fuel injection valve during the time for which the fuel injection valve is opened. Therefore, an injection pulsewidth (Ti) when the engine operates normally is calculated using the following equation (1):

$$Ti = Tp \times (1 + K_{TW} + K_{AS} + K_{AI} + K_{MR}) \times K_{FC} \times \alpha + T_S \quad (1)$$

In the equation (1), a basic pulsewidth ($T_p$) is a value (a quantity corresponding to a basic injection quantity) determined from an intake air quantity ($Q_a$) and engine revolutional speed (Ne). The air/fuel mixture ratio determined by the basic pulsewidth $T_p$ is called a basic air/fuel mixture ratio. Values added to the equation (1) (correction coefficient of coolant temperature incremental quantity $K_{TW}$, incremental correction coefficient $K_{AS}$ during start and after engine start, incremental correction coefficient $K_{AI}$ after engine idling, and air/fuel mixture ratio correction coefficient $K_{MR}$) are coefficients to make corrections to the basic pulsewidth $T_p$ according to various kinds of engine operating conditions input from sensors other than an airflow meter (for example, $K_{TW}$ is introduced to enrich the air/fuel mixture along with a reduction in coolant temperature ($T_W$) when it becomes effective below 60° C., and a difference provided between the incremental correction quantities $K_{TW}$ depending on whether an idling contact is turned ON or OFF when it becomes effective above 10° C.)

The total sum of these coefficients is equation (1) are expressed as various kinds of correction coefficients (Co). $K_{FC}$ denotes a fuel cut-off coefficient.

$\alpha$ denotes a feedback correction coefficient for the air/fuel mixture ratio and denotes a value at which three-element catalytic conversion (CCRO) functions efficiently. In order to clarify three components (CO, HC, $No_x$) of exhaust gas by means of catalytic conversion (CCRO), the air/fuel (A/F) mix ratio of the air/fuel mix needs to fall within a limited range (this range or, so called window, has the stoichiometric air/fuel mixture ratio of air/fuel mixture as a center). Therefore, it is better to perform feedback control of the A/F ratio to achieve higher control accuracy.

FIG. 1 shows a program for calculating the feedback correction coefficient $\alpha$ described above executed in a previously proposed A/F ratio controlling system.

In FIG. 1, in a step S1, a CPU of the microcomputer starts the program and determines whether a control area of the A/F ratio falls within a feedback control area of the air fuel mixture ratio (for example, conditions such that the temperature of the air/fuel mixture ratio sensor increases above an active temperature and conditions indicating the engine has not been started nor been in the idle state are satisfied). (It is noted that in FIG. 1, this state is abbreviated as "F/B control area"). In the step S1, in a case where control does not fall in the feedback (F/B) control area, the routine goes to a step S15 in which $\alpha$ is clamped. The program shown in FIG. 1 is executed whenever the engine has rotated through a predetermined crank angle.

The program shown in FIG. 1 shows an example of a proportional-integration (P-I) control operation in which the control center of $\alpha$ is 1.0 and $\alpha$ periodically changes as shown in the lower stage of FIG. 2. According to the operation described above, one period is divided into four cases (i) through (iv).

(i) In a case where the air/fuel mixture ratio is inverted from lean to rich, the detected air/fuel mixture ratio is changed stepwise by a proportional portion ($P_R$) to the lean side.

(ii) Thereafter, the air/fuel mixture ratio is gradually changed to the lean side by the integration portion ($I_R$) during the continuation of the rich air/fuel mixture state.

(iii) In a case where the air/fuel mixture ratio is inverted from rich to lean, the air/fuel mixture ratio is changed stepwise by the proportional portion ($P_L$) to the rich side.

(iv) Thereafter, the air/fuel mixture ratio is gradually changed to the rich side by the integration portion ($I_L$) during the continuation of the lean A/F mixture.

The determinations to divide the air/fuel mixture ratio into the above-described four cases are carried out by a combination of magnitude comparisons between an output value of the air/fuel mixture ratio sensor and a reference level (corresponding to the sensor output value with respect to the stoichiometric air/fuel mixture ratio) in steps S2, S3, and S9 and thereof previously carried out. "RL" in steps S3 and S9 denote flags storing the previous results of magnitude comparisons. RL=R indicates that the A/F (air/fuel mixture) ratio has previously been at the rich side and RL=L indicates that the A/F ratio has previously been at the lean side. As a result of this, the routine shown in FIG. 1 goes to steps S2, S3, and S4 when the A/F ratio is changed from the lean side to the rich side. In the same way, the routine goes to the steps S2, S3, and S7 when the A/F ratio continues at the rich side. The routine goes to steps S2, S9, and S10 when the A/F ratio is changed from the rich side to the lean side. The routine goes to steps S2, S9, and S13 when the A/F ratio continues at the lean side. It is noted that immediately after the magnitude comparison is inverted, the flag is changed in value in steps S4 and S10 after the inversion of the A/F ratio is carried out.

The following equations (4), (5), (6), and (7) indicate the proportional portion ($P_R$, $P_L$) and the integration portion ($I_R$ and $I_L$) according to the following cases in steps S5, S7, S11, and S13.

$$P_R = K_p \times \text{ERROR} \quad (4)$$

$$\Sigma I_R = K_I \times \text{ERROR} \quad (5)$$

$$P_L = K_p \times \text{ERROR} \quad (6)$$

$$\Sigma I_L = K_I \times \text{ERROR} \quad (7)$$

In the equations (4) through (7), ERROR denotes a difference from the stoichiometric air/fuel mixture ratio, $K_p$ and $K_I$ denote the feedback constant ($K_p$ denotes a proportional constant and $K_I$ denotes an integration constant). The same values as in the rich side and in the lean side can, in many cases, be adopted as shown in the equations (4) through (7). The feedback correction coefficients ($\alpha$) use the proportional portion and integration portion in steps S6, S8, S12, and S14. In the case of (i), $\alpha=\alpha-P_R$. In the case of (ii), $\alpha=\alpha-I_R$. In the case of (iii), $\alpha=\alpha+P_L$. In the case of (iv), $\alpha=\alpha+I_L$. The meaning of these numerical equations is to be read as the value stored as $\alpha$. The value added or substracted is newly added or subtracted as $\alpha$.

In such an apparatus as described above, the integration constant ($K_I$) described above is a constant value determined according to engine revolutional speed, engine load, coolant temperature, and so on. Since a value which is different for steady-state driving and transient-state driving conditions is not adopted, a limit is generated when hunting occurs during normal driving states or when variation of the air/fuel mixture ratio cannot be absorbed during transient driving states.

For example, as shown in FIG. 2, the feedback correction coefficient $\alpha$ is changed in a case when a basic fuel/air mixture ratio (an inversion of the air/fuel mixture ratio) which provides integration for system error is substantially changed stepwise from the rich side to the lean side (during a transient state). The change pattern of $\alpha$ is such as to require a stepwise change corresponding to the change in the basic fuel/air mixture ratio, as shown by a dot-dash line in FIG. 2. That is to say, the dotted line shown in FIG. 2 gives the required value for $\alpha$.

However, since the actual value of $\alpha$ shown by a solid line is changed on the basis of the integration constant, a response delay occurs at an interval B shown in FIG. 2 with respect to the required value of $\alpha$. This is because the integration constant defines a gradient for each line segment rising in a right-up direction or right-down direction. When the integration constant becomes large, the value of $\alpha$ is rapidly changed to enable improvement in response characteristics. When the control at the time of a steady state is performed with the integration constant having the same value as that during the transient driving state, hunting, in turn, occurs in the steady state. Therefore, the integration constant cannot be increased any more in that state.

In other words, since stability at the time of steady state driving conditions and good response at the time of transient state conditions are simultaneously required under such an air/fuel mixture ratio control, a value of the integration constant such as will not deviate from either of these requirements needs to be selected in order to balance these requirements with a single integration constant. A sufficient value thereof which simultaneously meets the above-described requirements is not always available under all engine operating conditions.

SUMMARY OF THE INVENTION

It is an object of the present invention to provide an improved system and method for controlling the air/fuel mixture ratio for an internal combustion engine.

It is another object of the present invention to provide an improved system and method for controlling the air/fuel mixture ratio for an internal combustion engine which achieves an integration constant of feedback control constants used for a calculation of an integration portion of a feedback correction coefficient included in a fuel supply quantity for the engine which simultaneously meets stability of control requirements at times of steady state driving conditions and good response control characteristics at times of transient state driving conditions.

The above-described objects can be achieved by providing a system for controlling an air/fuel mixture ratio for an internal combustion engine, comprising: a) first means for detecting engine driving conditions; b) second means for calculating a basic fuel supply quantity for the engine on the basis of the detected engine driving conditions; c) third means for detecting an actual air/fuel mixture ratio of the engine; d) fourth means for measuring deviation of the detected air/fuel mixture ratio from a target air/fuel mixture ratio; e) fifth means for determining whether the relationship of the magnitudes of both the detected air/fuel mixture ratio and the target air/fuel mixture ratio is inverted; f) sixth means for measuring accumulated parameters of engine operation after inversion of the relationship of the air/fuel mixture ratio whenever the fifth means determines that the relationship of the magnitudes of both air/fuel mixture ratio has been inverted; g) seventh means for setting a criterion to be compared with the measured accumulated parameters; h) eighth means for comparing the measured parameters with the criterion and setting an integration constant which satisfies both requirements of stability at times of steady driving conditions and of preferable response characteristics at times of transient driving conditions on the basis of the result of the comparison; i) ninth means for calculating an integration portion from the set integration constant and measured deviation and calculating a feedback correction quantity for the air/fuel mixture ratio including at least the integration portion; and j) tenth means for correcting the basic fuel supply quantity with the feedback correction quantity to determine a fuel supply quantity for the engine.

The above-described objects can also be achieved by providing a system for controlling an air/fuel mixture ratio for an internal combustion engine, comprising: a) first means for detecting engine driving conditions; b) second means for calculating a basic fuel supply quantity for the engine on the basis of detected engine driving conditions; c) third means for detecting the actual air/fuel mixture ratio of the engine; d) fourth means for measuring deviation of the detected air/fuel mixture ratio from a target air/fuel mixture ratio; e) fifth means for determining whether the relationship of magnitudes of both the detected air/fuel mixture ratio and the target air/fuel mixture ratio is inverted with respect to the target air/fuel mixture ratio; f) sixth means for measuring accumulated engine driving parameters after inversion of the relationship of the air/fuel mixture ratio whenever the fifth means determines that the relationship of the magnitudes of both air/fuel mixture ratios has been inverted; g) seventh means for setting and varying an integration constant according to engine driving conditions after the inversion of the relationship in the air/fuel mixture ratio, the integration constant satisfying both requirements of stability at times of steady driving conditions and of preferable response characteristics at times of transient driving conditions on the basis of the measured accumulation of driving parameters; h) eighth means for calculating an integration portion from the set integration constant and measured deviation and calculating a feedback correction quantity for the air/fuel mixture ratio including at least the integration portion; and, i) ninth means for correcting the basic fuel supply quantity according to the feedback correction quantity to determine a fuel supply quantity for the engine.

The above-described objects can also be achieved by providing a method for controlling an air/fuel mixture ratio for an internal combustion engine, comprising: a) detecting engine driving conditions; b) calculating a basic fuel supply quantity for the engine on the basis of the detected engine driving conditions; c) detecting an actual air/fuel mixture ratio of the engine; d) measuring deviation of the detected air/fuel mixture ratio from a target air/fuel mixture ratio; e) determining whether the relationship of magnitudes between the detected air/fuel mixture ratio and the target air/fuel mixture ratio is inverted with respect to the target air/fuel mixture ratio; f) measuring at least one accumulated engine driving parameter after inversion of the relationship in the air/fuel mixture ratio whenever determining that the relationship of the magnitudes of both air/fuel mixture ratios has been inverted; g) setting and varying an integration constant according to engine driving conditions after inversion of the relationship in the air/fuel mixture ratio, the integration constant satisfying both requirements of stability at times of steady driving conditions and of preferable response characteristics at times of transient driving conditions on the basis of the measured accumulation of the engine driving parameter; h) calculating an integration portion from the set integration constant and measured deviation and calculating a feedback correction quantity for the air/fuel mixture ratio including at least the integration portion; and, i) correcting the basic fuel supply quantity with the feedback correction quantity to determine a fuel supply quantity to the engine.

BRIEF DESCRIPTION OF THE DRAWINGS

FIG. 14 shows an explanatory view of the general concept of fuzzy control utilized in the fifth preferred embodiment.

FIG. 15 shows a characteristic graph of the cold zone, comfort zone, and hot zone in the case of the fuzzy control shown in FIG. 14.

FIG. 16 shows an explanatory view of the general concept of the fuzzy control shown in FIG. 14.

DETAILED DESCRIPTION OF THE PREFERRED EMBODIMENTS

Reference will hereinafter be made to the drawings in order to facilitate a better understanding of the present invention.

Figure 1:
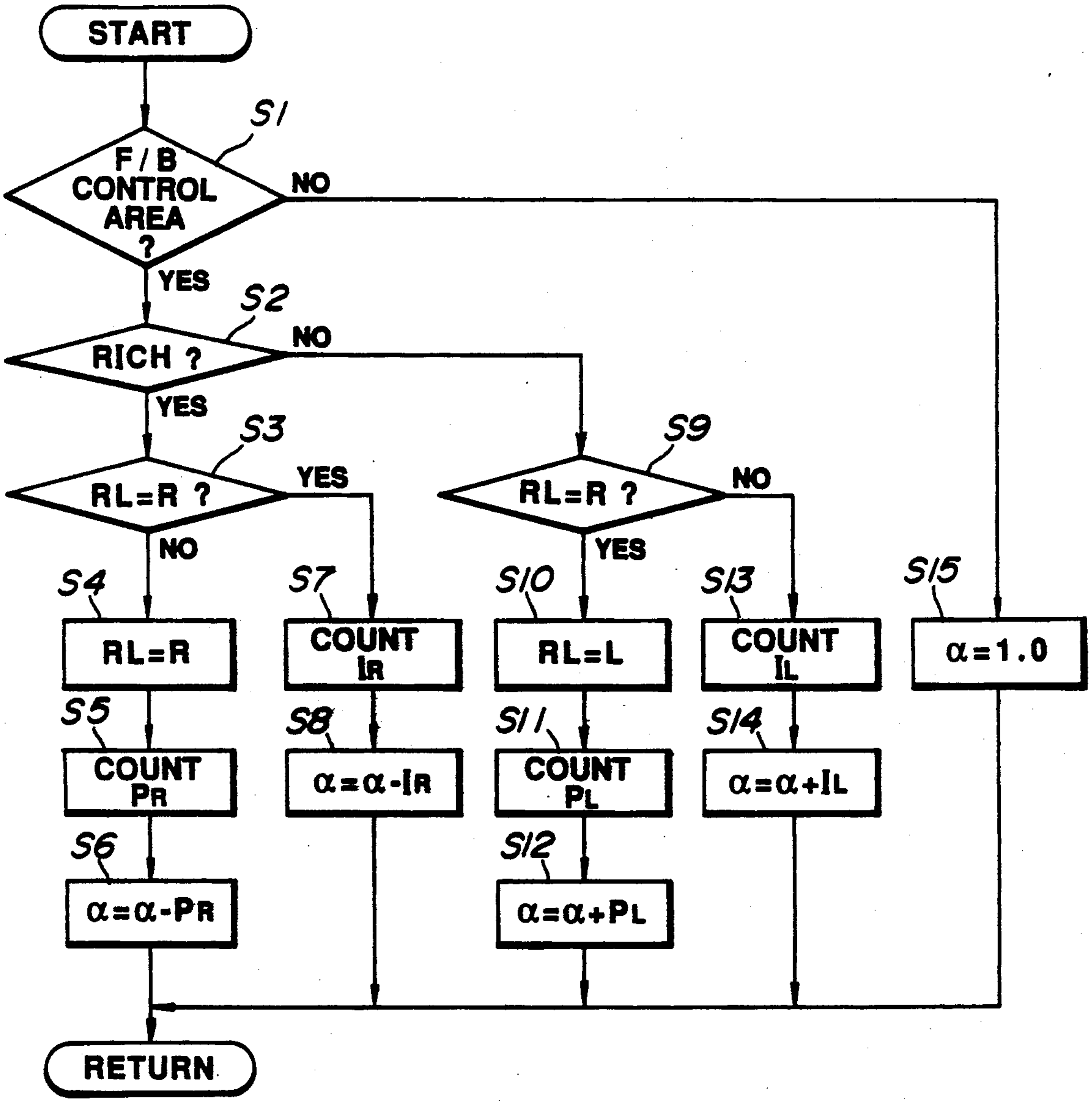
FIG. 1 shows a program flowchart for explaining the operation of a previously proposed air/fuel mixture ratio controlling system.
Figure 2:
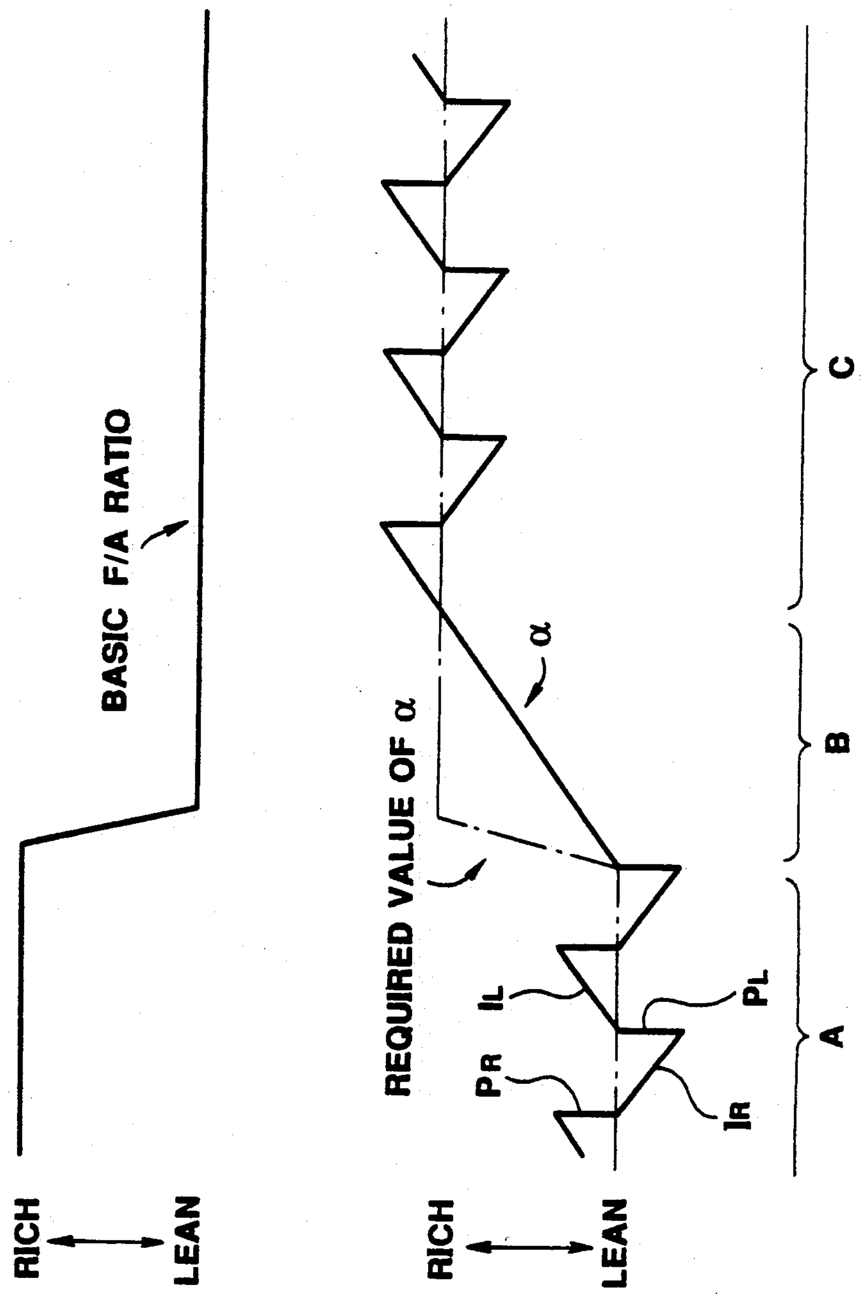
FIG. 2 shows waveform charts for explaining a change in a basic fuel/air mixture ratio and required value of $\alpha$ with respect to an actual $\alpha$ in the previously proposed air/fuel mixture ratio controlling system shown in FIG. 1.

FIGS. 1 and 2 show an operational flowchart and waveform chart for explaining operation of a previously proposed air/fuel (A/F) mixture ratio controlling system.

A detailed explanation of the previously proposed air/fuel mixture ratio controlling system has been made with reference to FIGS. 1 and 2 in the background of the invention.

FIRST PREFERRED EMBODIMENT

Figure 3:
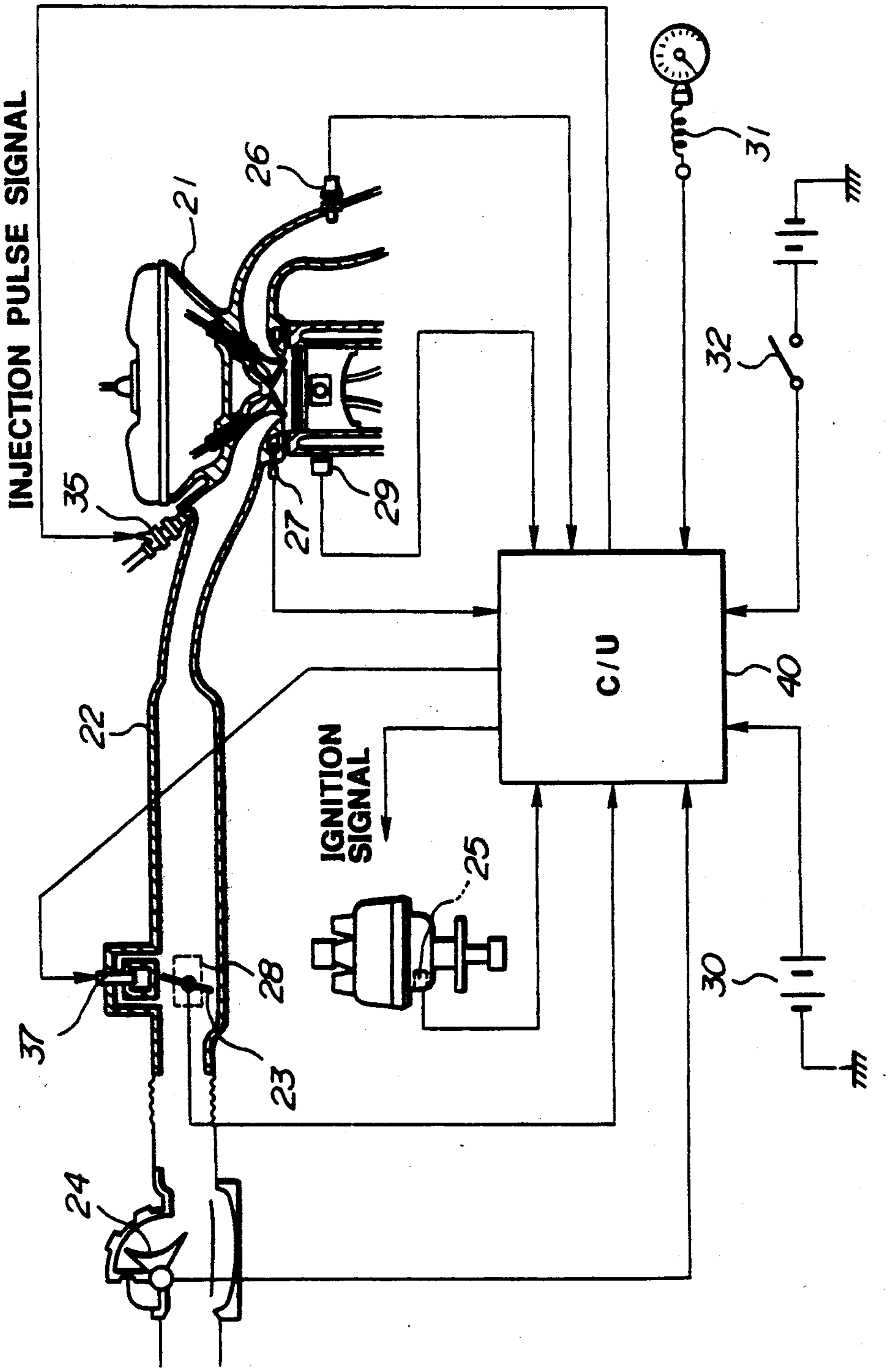
FIG. 3 shows a circuit block diagram of an air/fuel mixture ratio controlling system in a first preferred embodiment according to the present invention.

FIG. 3 shows a first preferred embodiment of an air/fuel (A/F) mixture ratio controlling system according to the present invention applicable to a fuel injected internal combustion engine mounted in a vehicle.

In FIG. 3, an airflow meter 24 is installed in an upstream side of an intake air passage having a throttle valve 23. An airflow meter 24 outputs a signal corresponding to an airflow quantity ($Q_a$) sucked in via an air cleaner and functions as an engine load sensor. A crank angle sensor 25 is installed on a distributor and outputs a rotational signal whenever an engine 21 has rotated through a unit angle of a crank angle and outputs a reference signal whenever the engine 21 has rotated and a rotational angle of an engine crankshaft has passed through a reference angular position. The engine rotational speed (Ne) is derived by counting the rotational signal of the crank angle sensor 25 by means of a control unit 40 to be described later.

An oxygen concentration sensor 26 is installed in an exhaust gas passage of the engine for outputting a signal having characteristics such as to abruptly change with respect to the stoichiometric (target) air/fuel mixture ratio which serves as a boundary line. The signal from an oxygen sensor as described above is treated as a feedback control signal for the air/fuel mixture ratio controlling system.

A coolant temperature sensor 27, an idle switch 28, and a knock sensor 29, are disposed within the engine. A vehicle battery 30 is connected to the control unit (C/U) 40 and an ignition key switch 32 is connected to the control unit 40.

The control unit 40 receives signals derived from these sensors (24 through 29). The unit 40 increases or decreases the fuel quantity from an fuel injection valve 35 installed in an intake port of each cylinder so as to achieve a control over a stoichiometric air/fuel mixture ratio (target air/fuel mixture ratio). For example, when a basic pulsewidth $T_p$ ($=K \times Q_a/N_e$, provided that K denotes a constant) is corrected with various kinds of coefficients (Co and Ts) and feedback correction coefficient ($\alpha$) of the air/fuel mixture ratio, an injection pulsewidth (Ti) at the time of a normal driving condition is derived by the following equation (1).

$$T_i = T_p \times Co \times \alpha + T_s \quad (1)$$

In the equation (1), values of the basic pulsewidth $T_p$, each coefficient of various kinds of correction coefficients (Co) (,e.g., coolant water temperature incremental correction coefficient $K_{TW}$ and after idle incremental correction coefficient $K_{AI}$) and voltage correction coefficient ($T_s$) are respectively derived by looking up tables stored in a memory (ROM (Read Only Memory) 43).

It is noted that the control unit 40 simultaneously carries out an ignition timing control and opening angle control for a valve 37 for an idle speed control (ISC).

Figure 4:
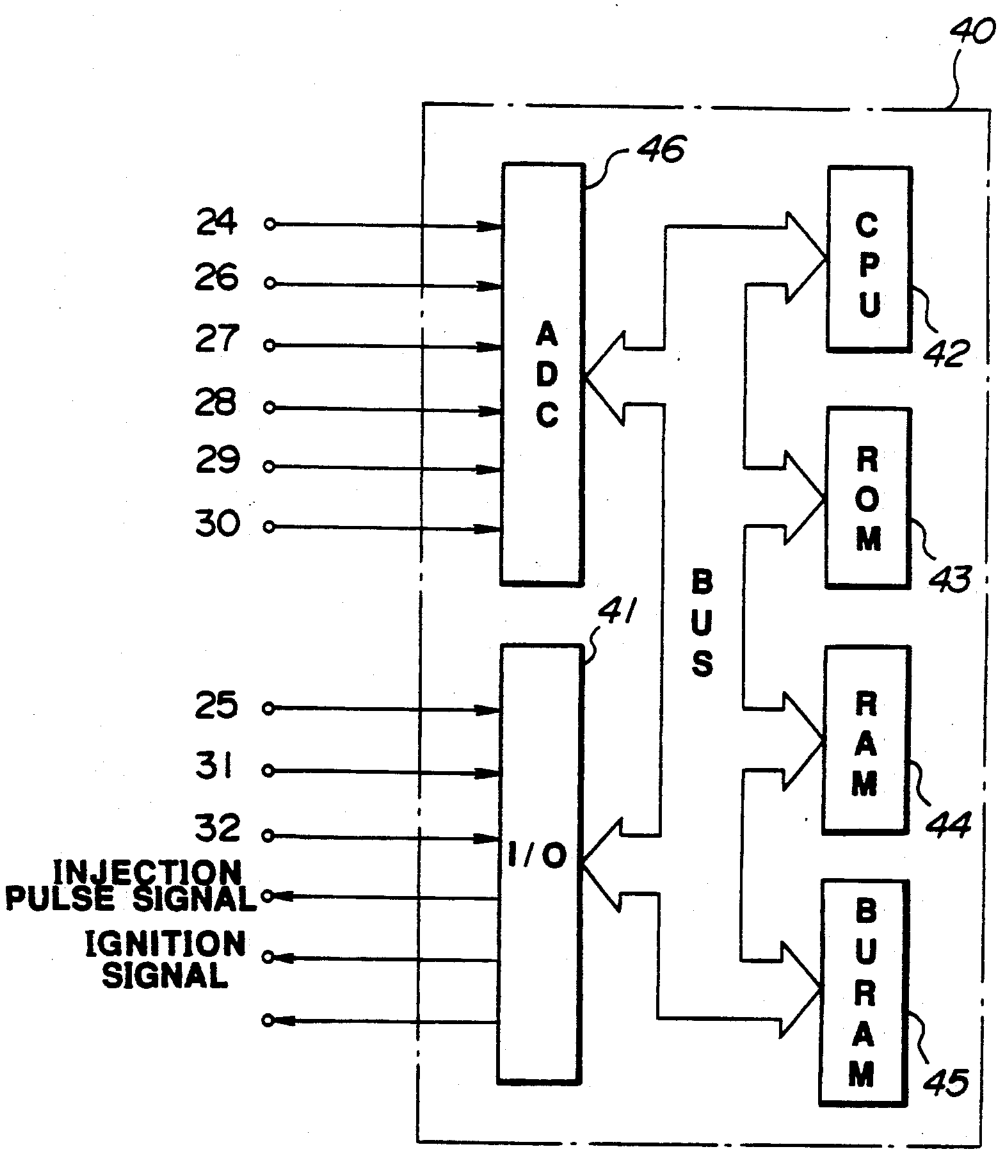
FIG. 4 shows a circuit block diagram of a control unit of the first preferred embodiment of the A/F ratio controlling system shown in FIG. 3.

FIG. 4 shows a circuit block diagram of the control unit 40 constituted by a microcomputer.

In FIG. 4, the microcomputer includes an I/O interface 41, CPU (Central Processing Unit) 42, ROM (Read Only Memory) 43, RAM (Random Access Memory) 44, BURAM 45 which holds the storage information even if an ignition switch of the engine is turned off, and A/D converter (ADC) 46 which converts each analog signal from the sensors 24 through 30 except 25 into a corresponding digital signal to be processed by the CPU 42.

Figure 5:
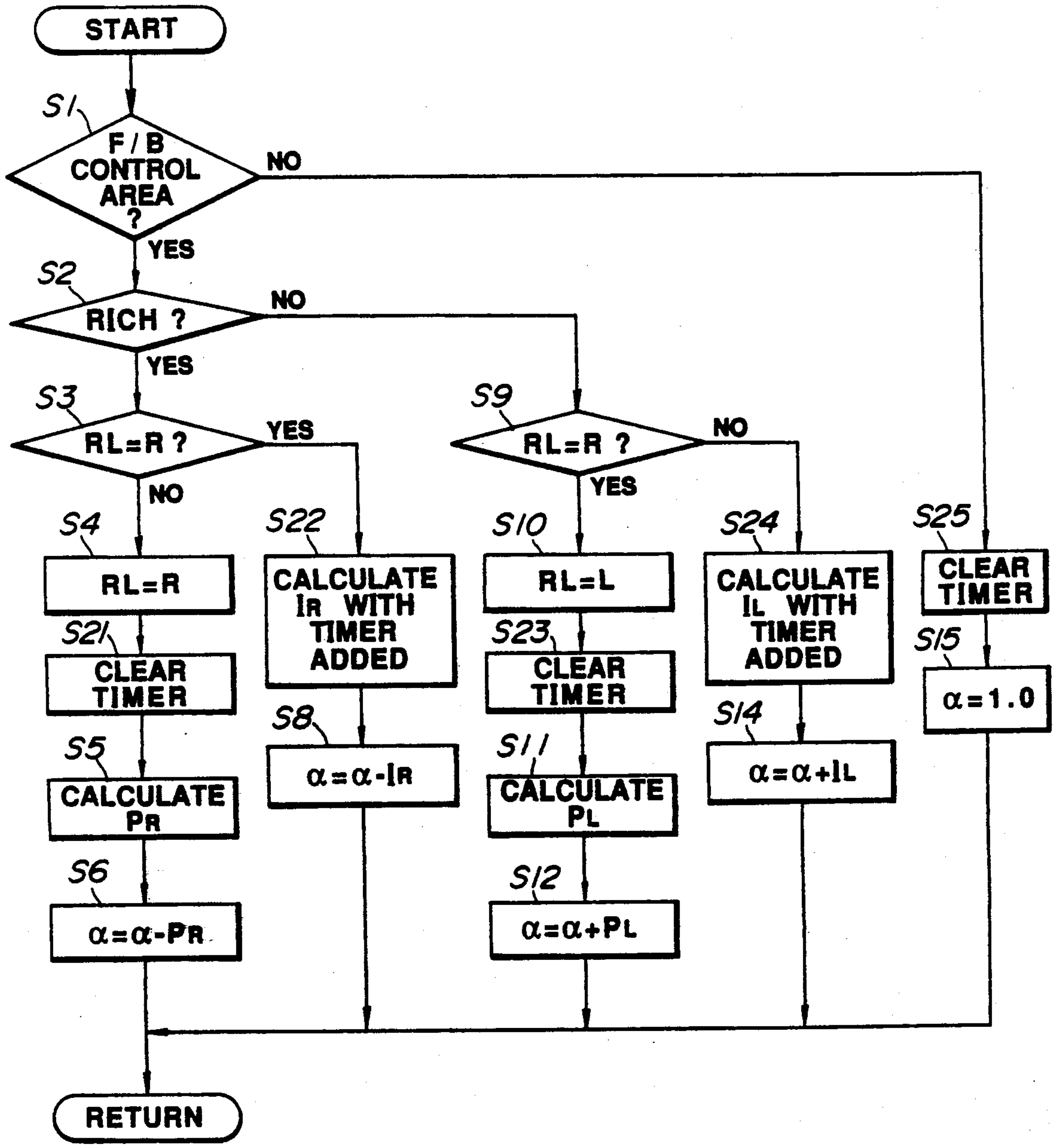
FIG. 5 shows a program flowchart for calculating a feedback correction coefficient $\alpha$ in the first preferred embodiment shown in FIGS. 3 and 4.

FIG. 5 shows a program flowchart of calculating a feedback correction coefficient ($\alpha$) for the air/fuel mixture ratio control in the first preferred embodiment.

The program shown in FIG. 5 is executed for each predetermined crank angle. It is noted that since the same reference numerals in steps as shown in FIG. 5 designate corresponding steps shown in FIG. 1, the detailed explanation thereof will be omitted here.

Therefore, steps of FIG. 5 different from those in FIG. 1 will mainly be described.

Since the routine goes to a step S22 in FIG. 5 when the A/F ratio continues to fall in a rich side, an integration portion ($I_R$) at the time of rich continuation is calculated in the step S22.

In this case, the microcomputer calculates the integration portion $I_R$ with a lapse time (T) after the A/F ratio is inverted from the lean side to the rich side without taking into account the engine revolutional speed, engine load, and coolant temperature. It is noted that the rich side is defined as the A/F ratio which is richer that the stoichiometric A/F ratio and the lean side is defined as the A/F ratio which is leaner than the stoichiometric A/F ratio.

Figure 11:
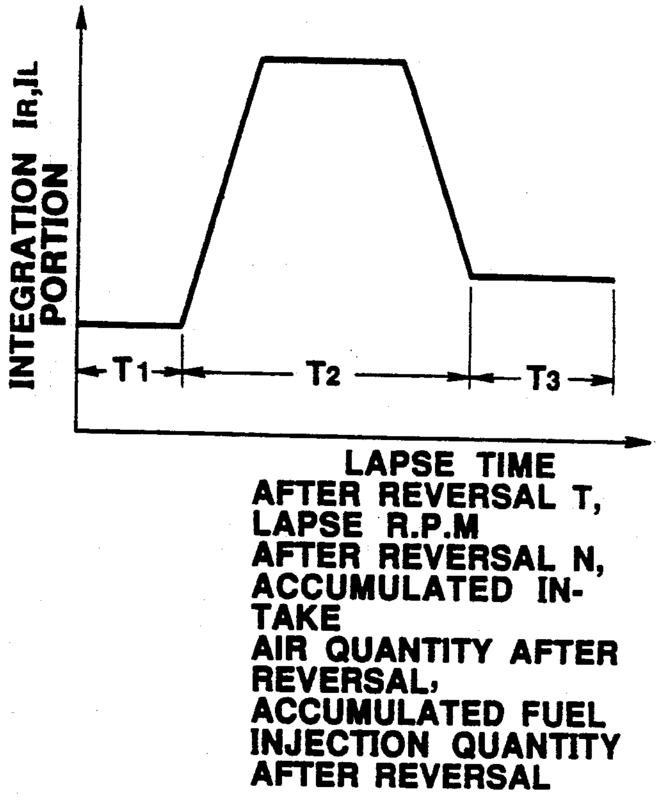
FIG. 11 shows a characteristic graph for explaining the integration portion of an integration constant used in the second through fourth preferred embodiments.

FIG. 11 shows a relationship between the lapse time (T) after the A/F ratio is inverted from the lean side to the rich side and a magnitude of the integration portion ($I_R$) during the continuation in the rich side.

The integration portion ($I_R$) is reduced until the predetermined time ($T_1$) has elasped, thereafter until a predetermined time ($T_2$) it is increased, and until the predetermined time ($T_3$) after the lapse of $T_1+T_2$ it is again reduced, as appreciated from FIG. 11.

In other words, the lapse time (T) after the inversion of the A/F ratio from the lean side to the rich side is divided into three cases, i.e., in a case where the lapse time after the inversion is short $I_R$ is small, in a case where the lapse time after the inversion is intermediate, $I_R$ is large, and in a case where the lapse time after the inversion is long, $I_R$ is again small.

The reason that the value of $I_R$ is small until $T_1$ is to set the $I_R$ to be small which is appropriate to the steady driving condition due to the incapability of confirmation whether it is in the steady state or in the transient state immediately after the A/F ratio is inverted from the lean side to the rich side (in the first preferred embodiment, the CPU does not specially determine whether the engine driving condition falls in the transient state).

In other words, since the A/F ratio is inverted under the steady state at substantially constant period, the small integration portion $I_R$ provides an appropriate value for the steady state, so that no hunting occurs in the A/F ratio control unless $I_R$ exceeds the period. Thus, $T_1$ is defined so as to meet the inversion period of $\alpha$ during the steady state.

In the case where the value of $I_R$ is set large until $T_2$, the CPU can determine that the engine falls in the transient state since the A/F ratio does not invert even after the passage of $T_1$. In this case, the integration portion $I_R$ needs to be increased in order to meet the requirement that the value of $\alpha$ should be changed with a good responsive characteristic at the time of the transient state. The time $T_2$ corresponds to a time duration from the start of transient state to the end thereof. The time $T_2$ needs to be set with the above-described time duration taken into account.

The reason that $I_R$ is again reduced when $T_1+T_2$, i.e., $T_3$ is that the CPU determines that the effect of the transient state is ended after the lapse of $T_1+T_2$ and the engine again returns into the steady state. However, the value of $I_R$ is slightly larger than that during $T_1$ and, thereby, a connection to the steady state becomes smooth.

Figure 6:
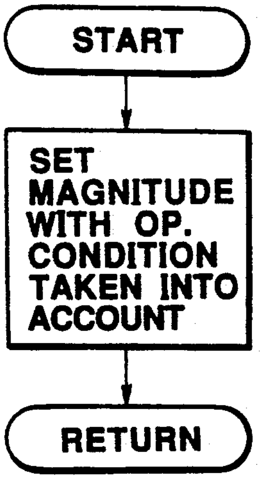
FIG. 6 shows a program flowchart for explaining the contents of calculation in the first preferred embodiment.

It is noted that the times $T_1$ through $T_3$ can be defined with the engine driving conditions taken into account (,e.g., a value which is not constant but which changes according to the driving condition). In this case, each of the small, intermediate, and large integration portions is set with the engine driving conditions added by means of a program shown in FIG. 6.

In FIG. 5, the microcomputer calculates another integration portion ($I_L$) during the continuation in the lean side in a step S24 in which the A/F ratio falls in the lean side. In the step S24, the CPU 42, in turn, calculates it with the lapse time (T) after the A/F ratio is inverted from the rich state to the lean state taken into account.

The values of $I_L$ with respect to the lapse time are given by the characteristic shown in FIG. 11.

Since the relationship shown in the equations (5) and (7) is present between each integration portion ($I_R$ and $I_L$) and integration constant ($K_I$), the integration constant needs to be set smaller in order to reduce each integration portion and larger in order to increase each integration portion.

A timer (installed in the microcomputer) is used to measure the lapse time upon the inversion of the A/F ratio. For example, the timer is prepared to again count time upon clearing. The timer is cleared in the step S21 immediately after the A/F ratio is inverted from the lean side to the rich side so that the value of the timer represents the lapse time after the A/F ratio is inverted from the lean side to the rich side. Therefore, the timer is cleared in the step S23 immediately after the A/F ratio is inverted from the rich side to the lean side. The timer value is used in the step (S24) in which the integration portion ($I_L$) during continuation in the rich state is carried out.

SECOND PREFERRED EMBODIMENT

In place of measuring the lapse time (T) after the inversion of the A/F ratio, the microcomputer may measure the number of engine revolutions (N) after the A/F ratio is inverted. This case is shown by a program of FIG. 7.

Figure 7:
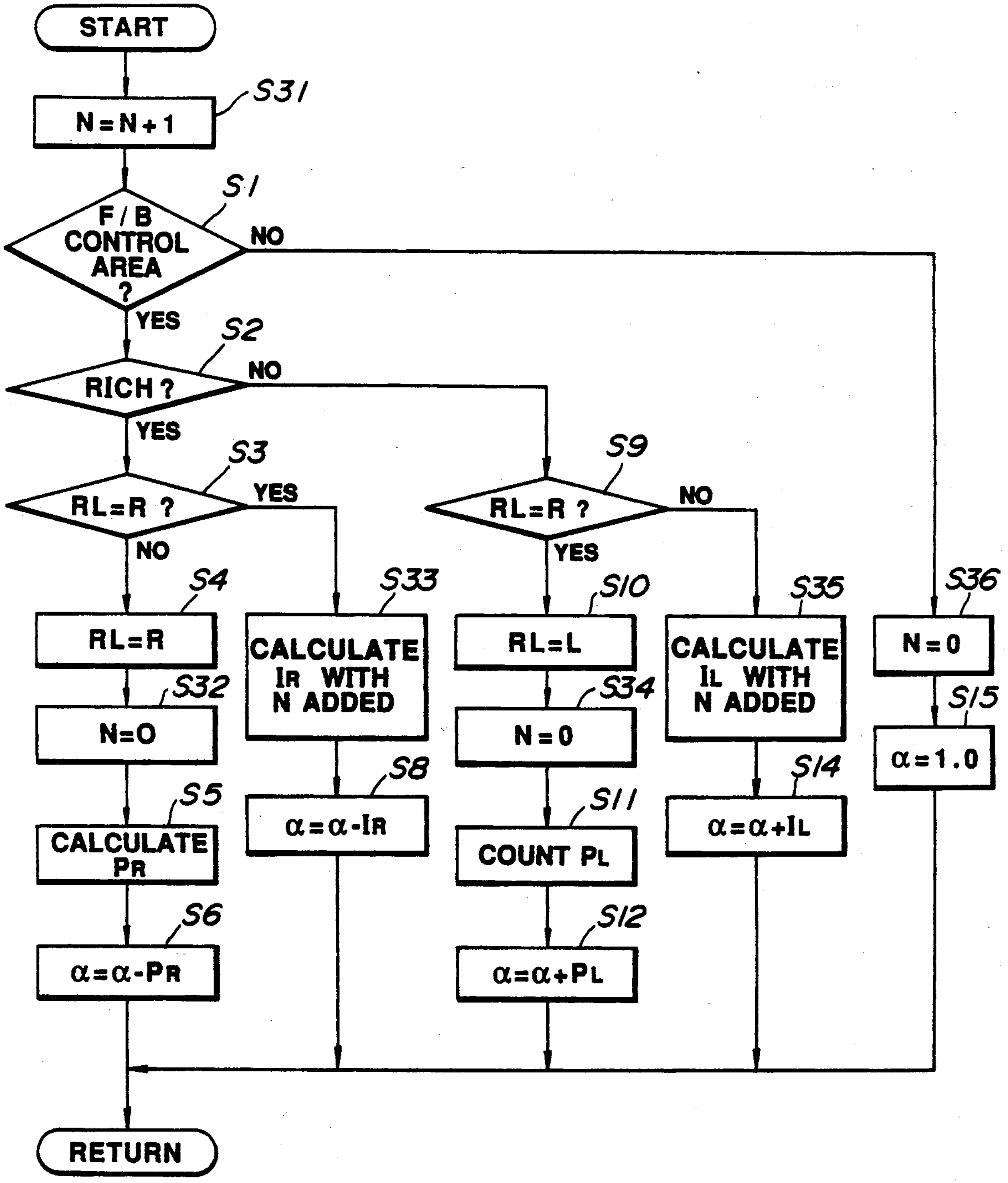
FIG. 7 shows a program flowchart for calculating the feedback correction coefficient in a second preferred embodiment.

As shown in FIG. 7, in a step S31, the microcomputer may count the number of engine revolutions (N) by which the engine revolves after the inversion of the A/F ratio is carried out.

In a step S31, the microcomputer counts the number of engine revolutions (N) by which the engine has revolved. In a step S34 or step S32, the microcomputer clears the counter for counting the engine revolutions (N) immediately after the A/F ratio is inverted from the lean side to the rich side or inverted vice versa. In a step S33, or step S35, the microcomputer calculates the integration portion ($I_R$, $I_L$) with the count value, i.e., the engine revolutions (N) taken into account. The characteristic of the integration portion in this embodiment may be such as to replace a horizontal axis with the lapse number of engine revolutions (N) after the inversion of A/F ratio is carried out.

THIRD AND FOURTH PREFERRED EMBODIMENTS

Similarly, in place of the lapse time after the inversion, an accumulated value of the intake air quantity after the inversion (accumulated intake air quantity) Air or an accumulated value S of the fuel injection quantity after the inversion of A/F ratio may be used.

Figure 8:
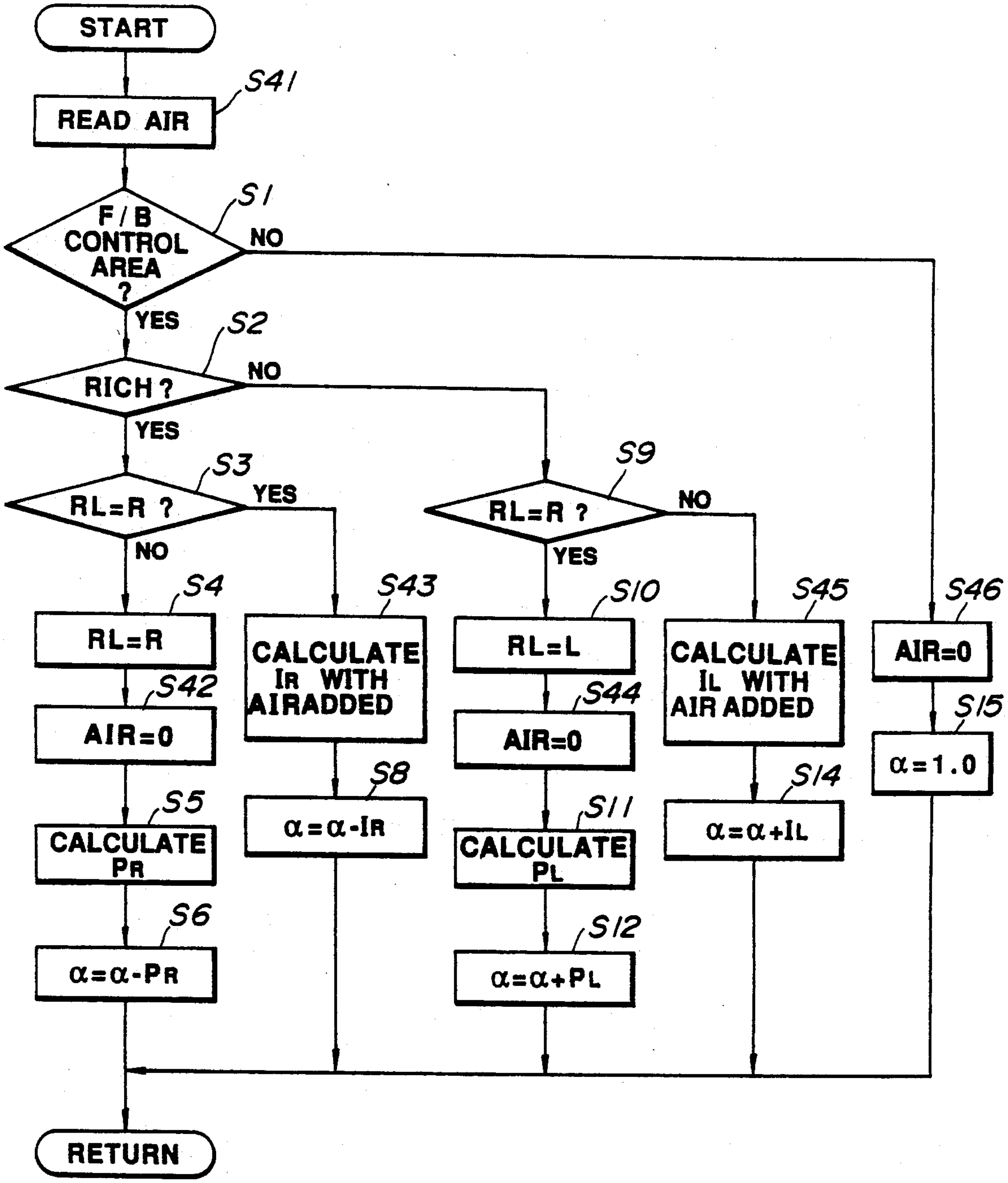
FIG. 8 shows a program flowchart for calculating the feedback correction coefficient in a third preferred embodiment.
Figure 10:
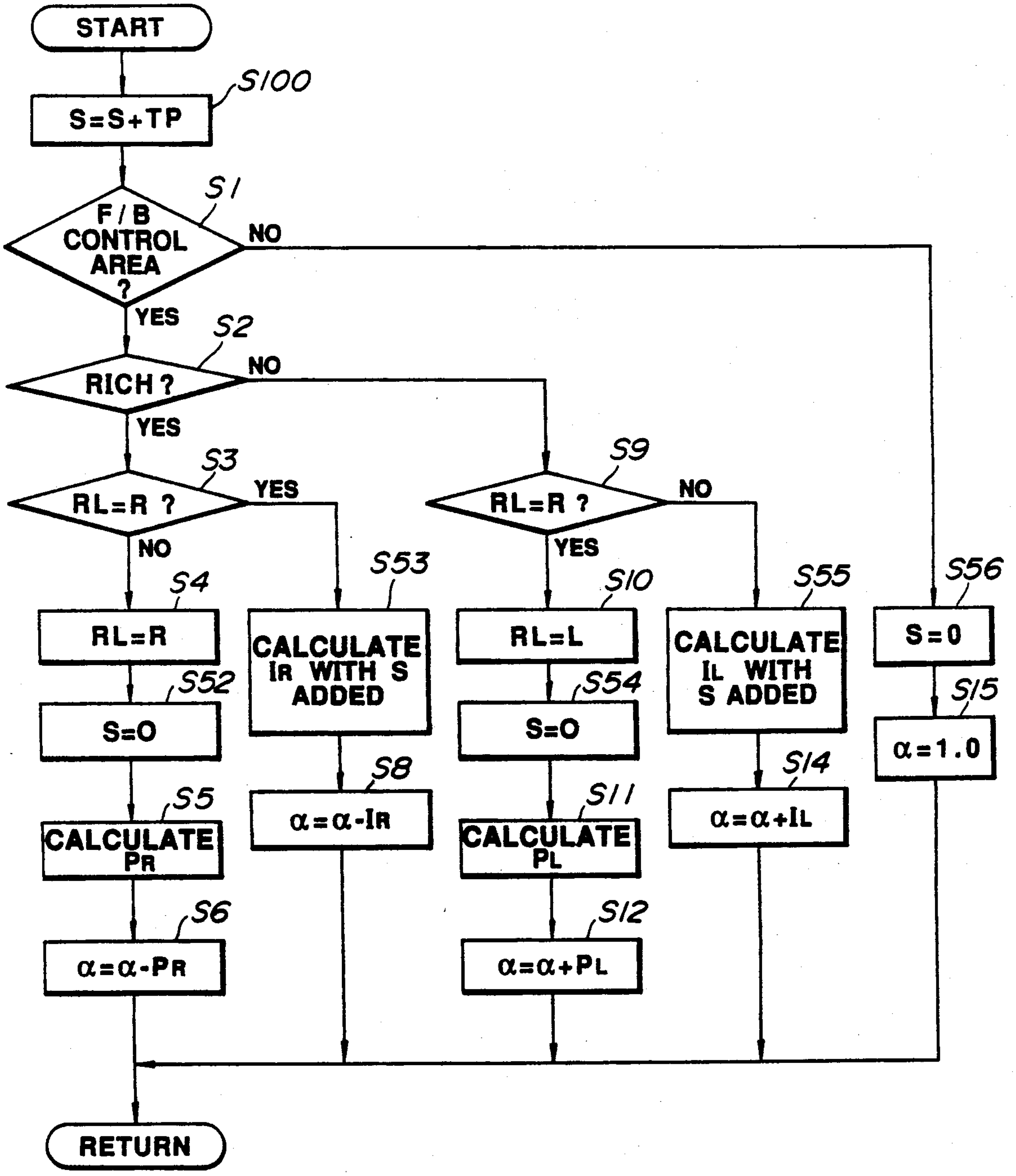
FIG. 10 shows a program flowchart for calculating the feedback correction coefficient in a fourth preferred embodiment.

Programs in the cases described above are shown in FIGS. 8 and 10.

The characteristics of the integration portions for the respective accumulated values are shown in FIG. 11.

Figure 9:
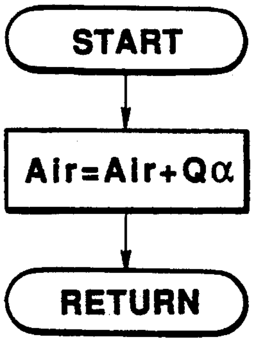
FIG. 9 shows a program flowchart for explaining the contents of calculation in the third preferred embodiment.

However, since the airflow meter 24 measures the air quantity ($Q_a$) for the accumulated value of intake air quantity, a memory (RAM 44) (Air) which stores the accumulated value of the air quantity ($Q_a$) in the program of FIG. 9 is prepared so that the value stored in the memory (Air) is used in the program of FIG. 7 and is executed for each predetermined crank angle.

It is possible to define the characteristic of the integration portion with the engine driving condition taken into account in the other three preferred embodiments.

The actions of the above-described preferred embodiments so constructed will be explained with reference to FIG. 12.

Figure 12:
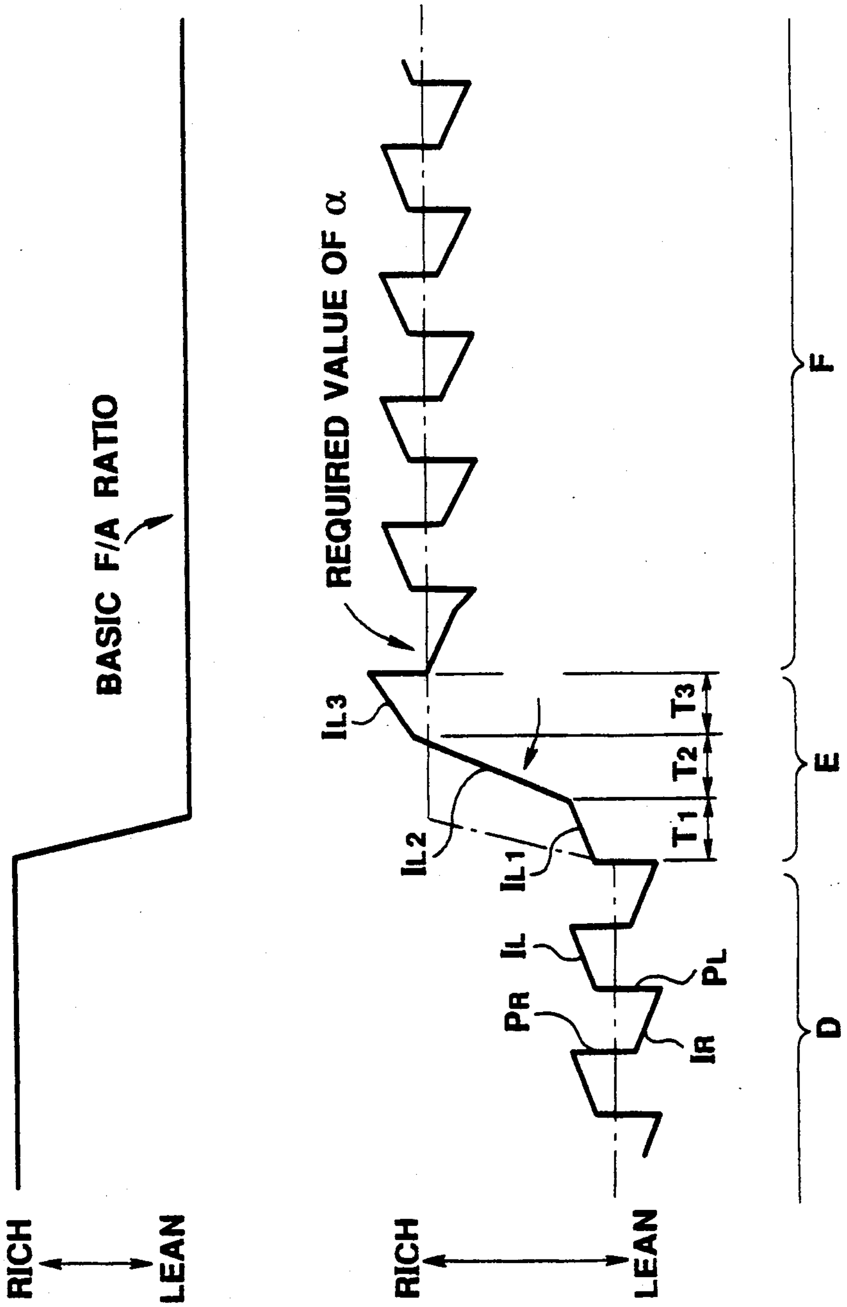
FIG. 12 shows waveform charts for explaining action of the above-described first through fourth preferred embodiments, particularly in the first preferred embodiment shown in FIG. 4.

FIG. 12 shows a representative change characteristic of the feedback correction coefficient ($\alpha$) in the first preferred embodiment shown in FIG. 5 in a case where the base fuel/air mixture ratio is stepwise changed in the same way as in FIG. 2.

Since the A/F ratio is inverted within a shorter time than $T_1$ at intervals of D which is in the steady state before the basic F/A ratio is changed at interval of F after the transient state is complete, the small integration portions ($I_R$, $I_L$) are given according to the characteristic shown in FIG. 11.

Since each integration portion determines a gradient of a right-up slope and a right-down slope of line segments, the minor integration portion causes the gradients of the line segments to become more moderate than the case of the previously proposed air/fuel mixture ratio controlling system shown in FIG. 2.

Little hunting occurs with respect to the required value of $\alpha$ shown by a dot-dash line of FIG. 12.

When the basic fuel/air mixture ratio is stepwise changed after the lapse of the interval of D, a minor integration portion ($I_{L1}$) during the lean continuation is provided for the time $T_1$ from the time duration after which the change in the basic fuel/air mixture ratio is started. In this case, since the air/fuel mixture ratio is not inverted after the passage of time $T_1$, the large integration portion ($I_{L2}$) is, in turn, provided according to the characteristic shown in FIG. 11 for the time duration of $T_2$ after the passage of $T_1$. Therefore, the gradient of the right upward line segment shown in FIG. 12 becomes more steep than the case of the previously proposed air/fuel mixture ratio controlling system shown in FIG. 2, and rises during the time duration of $T_2$.

The integration portion ($I_{L2}$) of such a steep rise as described above sufficiently follows the required value of $\alpha$ denoted by the dot-dash line. Therefore, a response delay at an interval of E indicating the duration of the transient state can be prevented.

When the time passes $T_2$, the microcomputer determines the end of the transient state. Then, a minor integration portion ($I_{L3}$) is again provided in the same way as during the steady state and thereafter the gradient of the line segment again becomes moderate.

The integration constant is set so as to provide the most appropriate integration portions for the times during the steady state and during the transient state, respectively. Thus, the hunting can be suppressed during the normal operating condition. In addition, the response delay at the time of the transient state can be prevented. Furthermore, the harmful exhaust gas component can be reduced appreciably.

Since the minor integration portion is again set from the time at which the transient state is ended to the time at which the steady state is started, the smooth connection to the air/fuel mixture ratio can be made.

Although in the above-described embodiments $\alpha$ is derived for the proportional-integration operation, the present invention can be applied to the feedback control in which the integration operation is included (for example, proportional-integration-differential control).

FIFTH PREFERRED EMBODIMENT

Figure 13:
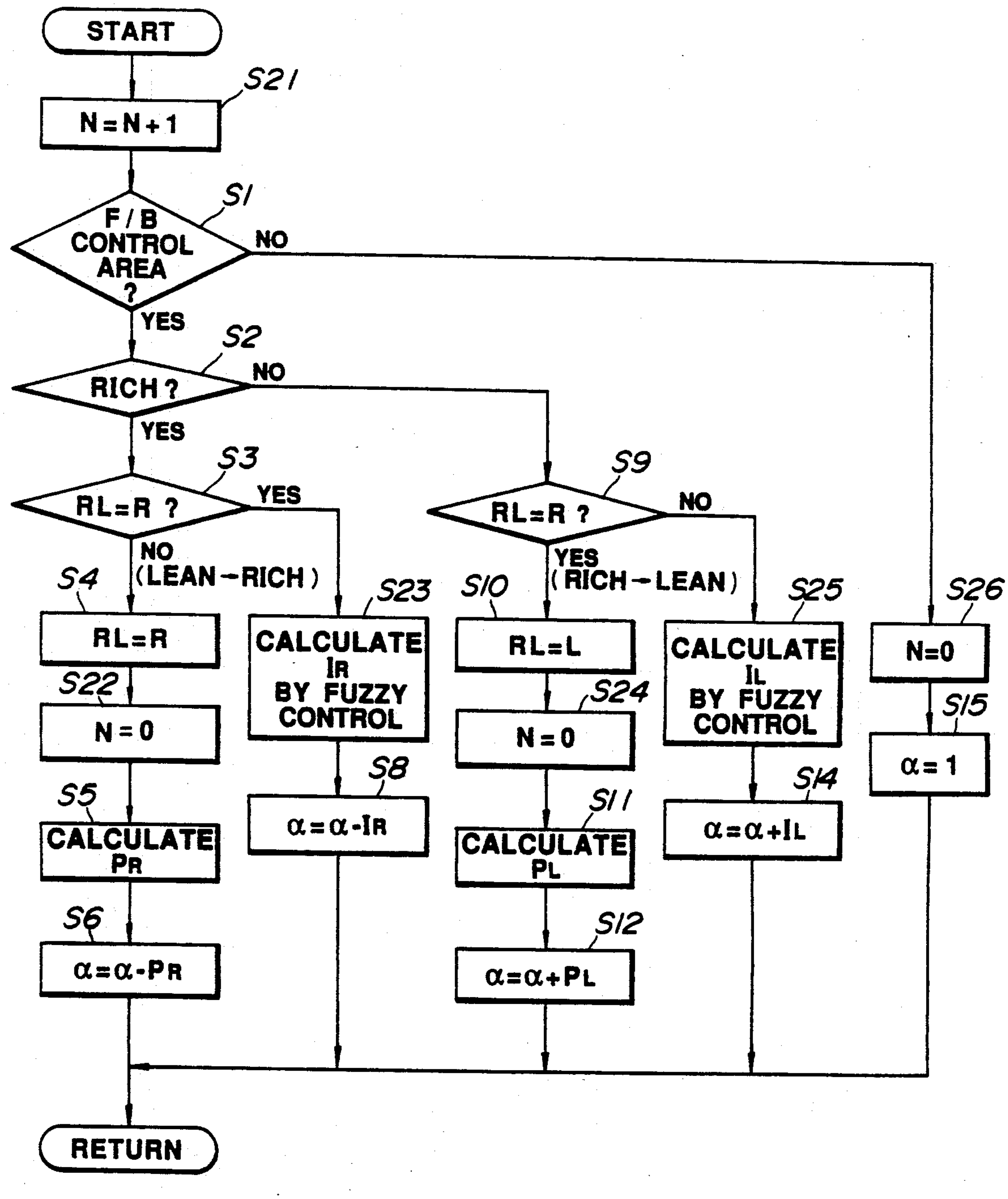
FIG. 13 shows a program flowchart for calculating the feedback correction coefficient in a fifth preferred embodiment.

FIG. 13 shows a program executed by the control unit 40 to derive the air/fuel mixture ratio feedback correction coefficient ($\alpha$) in a fifth preferred embodiment. It is noted that the hardware structure of the fifth preferred embodiment is the same as in the first preferred embodiment shown in FIGS. 3 and 4.

In the fifth preferred embodiment, the CPU 42 determines whether the present engine driving condition is at an end of the transient state in addition to the determination whether the engine falls in the steady state or transient state so that the engine driving condition is divided into three states and sets the integration constants which are different from each other according to each of the driving conditions.

In a step S21 of FIG. 13, a memory value of N is incremented by one ($N=N+1$). Immediately after the A/F ratio is inverted from the lean side to the rich side, the value of the memory N is cleared in a step S22. In the same way, immediately after the A/F ratio is inverted from the rich side to the lean side, the value of the memory N is cleared in a step S24.

The value of the memory N in steps S23 and S25 indicates the accumulated number of revolutions immediately after the A/F ratio is inverted in the step S23 during the continuation in the rich side and in the step S25 during the continuation in the lean side.

In the steps S23 and S24, the integration portions $I_R$ and $I_L$ are derived on the basis of the accumulated number of revolutions (N).

The concept of fuzzy control is adopted in the calculation of the integration portion ($I_R$ or $I_L$) on the basis of the accumulated number of the engine revolutions (N) after the inversion of the air/fuel mixture ratio in steps S3 and S9 is carried out.

A general concept of fuzzy control will be described below (refer to pages from 50 through 54 of Japanese document "Nainen kikan (internal combustion engine)", volume 27, No. 339, published on January 1988, pages from 65 through 72 thereof published on February, 1988, and pages 17 through 20 of a Japanese document "Introduction of Fuzzy system" published by Ohm sha on April, 1987).

As shown in FIG. 14, with a deviation between a controlled variable and target value derived from a controlled object by using a sensor taken into account, a fuzzy control unit determines an operating variable of the controlled object. In the case of normal feedback control, a mathematical model of the controlled object is prepared in the control unit. However, in the case of fuzzy control, control rules in the form of "if——— then—— are described. The part of——— describes conditions and operating variables including a fuzzy set.

A specific example of the fuzzy control which adjusts a knob of a gas stove to maintain a room temperature constant will be described below with reference to FIGS. 15 through 18.

(i) preparation of control rules (1) Definition of a fuzzy set: Suppose that the meaning of such fuzzy words as "cold", "hot", and "comfort zone (not hot but not cold)" would be expressed. Almost all people positively feel that it is cold at a temperature below zero (° C.). Almost all people positively feel that it is hot at a temperature above 40° C. Then, a temperature zone at which almost all people do not feel that it is not cold but it is not hot (comfortable) is positively present. In addition, it is thought that the temperature at 5° C. has a degree of coldness larger than that at 10° C. Then, suppose a grade belonging to a fuzzy set such that a temperature element is cold. A grade ($\omega$) is represented such that $\omega=1$ when completely belonging thereto and $\omega=0$ when not completely belonging thereto and by numerical values when not belonging to neither cases.

Therefore, the grade ($\omega$) can be represented in graph as in FIG. 15.

It should be noted that a function transformed from the temperature element to the grade ($\omega$) is called a membership function.

Fuzziness implied in the word such as "cold" can thus be represented by numerical values. For example, for 17° C., the grade with respect to "cold" is 0.2, the grade with respect to "comfort zone" is 0.8, and the grade with respect to "hot" is 0.0.

(2) Preparation of control rules: If no knowledge of the controlled object is present, it is necessary to use a trail and error method to prepare the control rules. However, the rules can be prepared as shown in FIG. 16 on the basis of the experience of usual life.

Rule 1: If "cold" then "open the knob through five degrees".

Rule 2: If "comfort" then "nothing is carried out".

Rule 3: If "hot" then "close the knob through five degrees".

It is noted that the part of "———" of if——— then is called an input membership function and the part of—— of then—— is called an output membership function.

The detailed explanation of the fuzzy control application is exemplified by a U.S. patent application Ser. No. 213,927 filed on June 30, 1988 (European Patent Application filing number EP 88110569.6 filed on July 1, 1988), the disclosure of which is hereby incorporated by reference.

(ii) Execution method:

The operating variable of the knob is derived when the room temperature is 17° C.

(1) the microcomputer calculates how the condition of each rule accommodates with 17° C. This may be solved by calculating the values of the membership functions for 17° C. with respect to each rule. That is to say, the degree of accommodation for each rule ($\omega_i$, provided that i denotes an integer of 1 through 3) is as follows:

Rule 1: $\omega_1=0.2$

Rule 2: $\omega_2=0.8$

Rule 3: $\omega_3=0.0$ (2) An operating variable ($\Delta U$) of the knob is calculated as a weight mean by means of a degree of accommodation ($\omega_i$) of each rule.

$$\begin{aligned}\Delta U &= \text{(open the knob through five degrees)} \times \omega_1 + \text{(nothing is done)} \times \omega_2 + \text{(close the knob through five degrees)} \times \omega_3 \\ &= \text{(open the knob through five degrees)} \times 0.2 + \text{(nothing is done at all)} \times 0.8 + \text{(close the knob through five degrees)} \times 0.0 \\ &= \text{(open the knob through one degree)}\end{aligned} \quad (1X)$$

Consequently, in a case where the room temperature is 17° C., the knob will be rotated through one degree.

Such a series of procedures in the fuzzy control as is described above is, then, applied to the calculation of the integration portion ($I_R$ or $I_L$) in the fifth preferred embodiment.

The series of procedures in the fuzzy control in the fifth preferred embodiment will be described below.

(i) Preparation of control rules (1) Definition of fuzzy set

The following is how to provide the membership functions for such fuzzy words as "steady", "transient", and "transient end". The conclusion is that the membership functions (the word "steady" is represented by a, the word "transient" is represented by b, and the word "transient end" is represented by c) for these fuzzy words are provided in continuous values in a trapezoidal form as shown in FIG. 17.

Figures 17, 18:
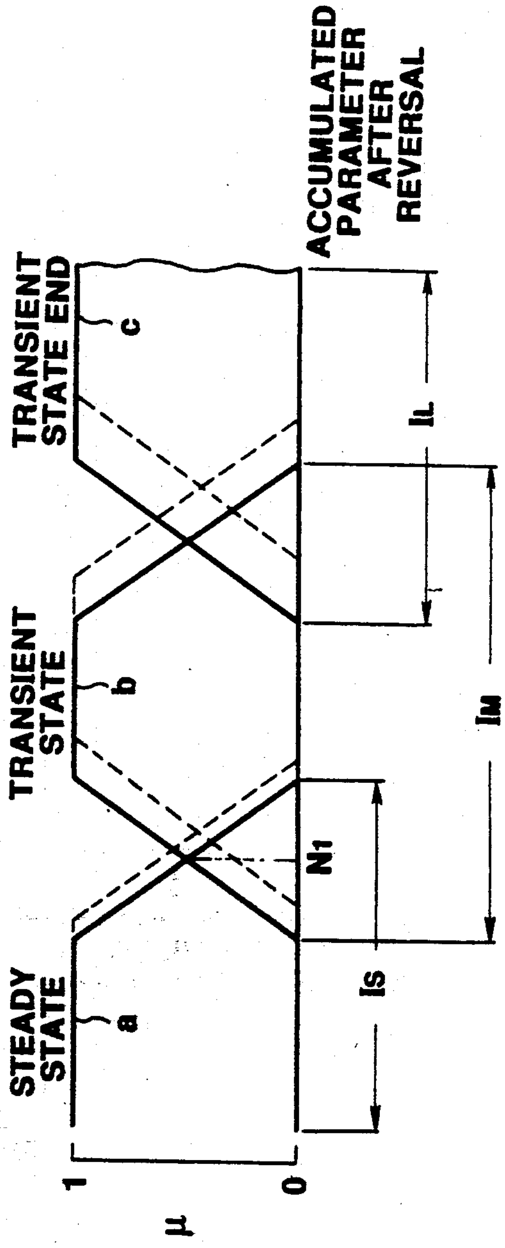
FIG. 17 shows a characteristic graph of a general concept of a fuzzy control as applied to the fifth preferred embodiment.
FIG. 18 shows an explanatory view of input and output membership functions of the fuzzy control in the air/fuel mixture ratio controlling system of the fifth preferred embodiment.

In FIG. 17, a horizontal axis denotes an accumulated number of engine revolutions (N) after the air/fuel mixture ratio is inverted. However, since equivalents to N are an accumulated time after the A/F ratio is inverted, accumulated intake air quantity after the inversion thereof, accumulated fuel injection quantity after the inversion thereof, and so on. Therefore, these equivalents are, in general, represented as accumulated parameters after the A/F ratio is inverted in FIG. 17.

In FIG. 17, for example, if the accumulated engine revolutions after the inversion is $N_1$, a degree of accommodations (S) for the "steady state" is determined as $S=0.5$, the degree of accommodations (M) for the "transient state" is as $M=0.5$, and the degree of accommodation (L) for the "transient state end" is as $L=0.0$.

In a case where the fuzzy control is carried out, the membership function in a form of a straight line or trapezoid is often used. However, the membership function in the form of curve or in the form of discrete values may alternatively be used.

(2) Preparation of control rule:

The following three rules $R_a$ through $R_c$ will be described in the following rule table as shown in FIG. 18.

Rule $R_a$: if "steady state" then "$D_2$".

Rule $R_b$: if "transient state" then "$D_3$".

Rule $R_c$: if "transient state end" then "$D_4$".

In the case where D2 through D4 are integration constants set in the cases where the engine driving conditions are steady state, transient state, and transient state end. D2 is set small, D3 is set large, and D4 is set at a value substantially the same as D2 or intermediate (middle).

The above-described rules $R_a$ through $R_c$ are derived from an empirical rule. For example, a reason for a minor integration constant (D2) during the steady state is that the integration portion calculated from the integration constant (D2) is reduced to suppress the hunting and the air/fuel mixture ratio control becomes stable during the steady state. On the other hand, the major integration constant (D3) at the time of the transient state is to enlarge the integration portion, in this case, and to change the air/fuel mixture ratio feedback coefficient oc with a good responsive characteristic when the engine falls in the transient state.

The reason that the small or intermediate integration constant (D4) at the "transient end" is again provided is that the air/fuel mixture ratio control becomes unstable, since the undershooting or overshooting occurs if the integration portion remains enlarged even after the end of "transient" state.

(ii) Execution method

Figure 19:
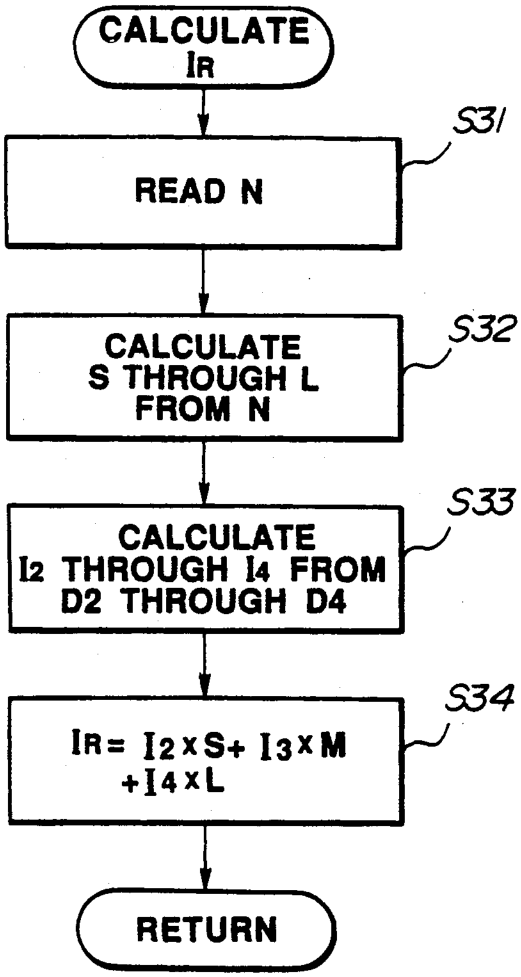
FIG. 19 shows a program flowchart for calculating $I_R$ in the fifth preferred embodiment.

FIG. 19 shows a sub program executed as the execution method and constituting each contents of the steps S23 and S25 of FIG. 13. Since the same operation is included in both steps S23 and S25 ($I_L$ in the step S25), the contents of the step S23 will representatively be described below.

In a step S31, the CPU 42 calculates the degrees of accommodations S through L of respective rules ($R_a$ through $R_c$) from the read accumulated revolutional speeds (N) after the air/fuel mixture ratio is inverted (S for the membership function a, M for the membership function b, and L for the membership function c).

It is noted that deriving the degree of accommodations corresponds to the determinations whether the engine driving condition falls in any one of the steady state, transient state, or transient state end.

In a step S33, the microcomputer calculates the integration portions ($I_2$ through $I_4$) in the respective three conditions from the integration constants (D2 through D4) using the following equations (71), (81), and (91).

$$I_2 = D2 \times T_P \quad (71)$$

$$I_3 = D3 \times T_P \quad (81)$$

$$I_4 = D4 \times T_P \quad (91)$$

In the equations (71) through (91), the term $T_P$ denotes a basic pulsewidth determined from the engine load and engine revolutional speed.

Although the integration portion is calculated from the integration constant and air/fuel mixture ratio deviation (ERROR) in the normal feedback control, the oxgen concentration sensor can detect only whether the air/fuel mixture ratio is deviated toward the rich side or toward the lean side with respect to the stoichiometric A/F ratio. Therefore, the deviation of the A/F ratio with respect to the stoichiometric air/fuel mixture ratio cannot be measured by means of the oxygen concentration sensor. $T_P$ is adopted as a value changing according to the engine driving parameters.

$I_2$ through $I_4$ may be calculated with the other engine driving conditions such as coolant temperature and so on added. In this case, the integration portions are calculated from the integration constant and deviation of air/fuel mixture ratio (ERROR) in the normal feedback control. $I_2$ through $I_4$ may become suitable for the other engine driving conditions.

The integration portion ($I_R$) as the operating variable may be calculated using the following equation in the step S34 of FIG. 19.

$$I_R = I_2 \times S + I_3 \times M + I_4 \times L \quad (100)$$

$I_R$ denotes an average of $I_2$ through $I_4$ which are provided for degrees of accommodations (S through L) of the respective rules as weights.

The equation (100) can also be expressed by substituting the equations (71) through (91) as follows:

$$I_R = (D2 \times S + D3 \times M + D4 \times L) \times T_P \quad (110)$$

The action of the fifth preferred embodiment will be described below.

The integration constants are separated depending on the steady state and the transient state.

The small integration constant (D2) is provided during the steady state and, then, the air/fuel mixture ratio control becomes stable. At the time of the transient state, the large integration constant (D3) is provided so that the feedback correction coefficient $\alpha$ follows up with a good responsive characteristic.

On the other hand, if the same large integration constant (D3) as that during the transient state is provided at the stage of transient state end, overshooting and/or undershooting occurs because of a too large integration proportion calculated from the corresponding integration constant.

However, since in the fifth preferred embodiment the integration constant (D4) having the same small magnitude as that during the steady state but which is smaller than that during the transient state in the case of the transient state end, the integration portion becomes reduced so that neither overshooting nor undershooting occurs and settling time becomes shorter. In addition, the driving state connection for engine driving after the transient state end becomes smooth.

Furthermore, the fuzzy control uses the membership functions (a through c) and rule tables to derive the integration portions ($I_R$, $I_L$). Since it is sufficient to carry out matching by the number of output membership functions shown in FIG. 16, it becomes easy to accommodate in terms of the actual aspect of application and it becomes cost effective. This is because such fuzzy values as "steady", "transient", and "transient end" may only be provided as a fuzzy set such as the membership functions.

SIXTH PREFERRED EMBODIMENT

Figure 20:
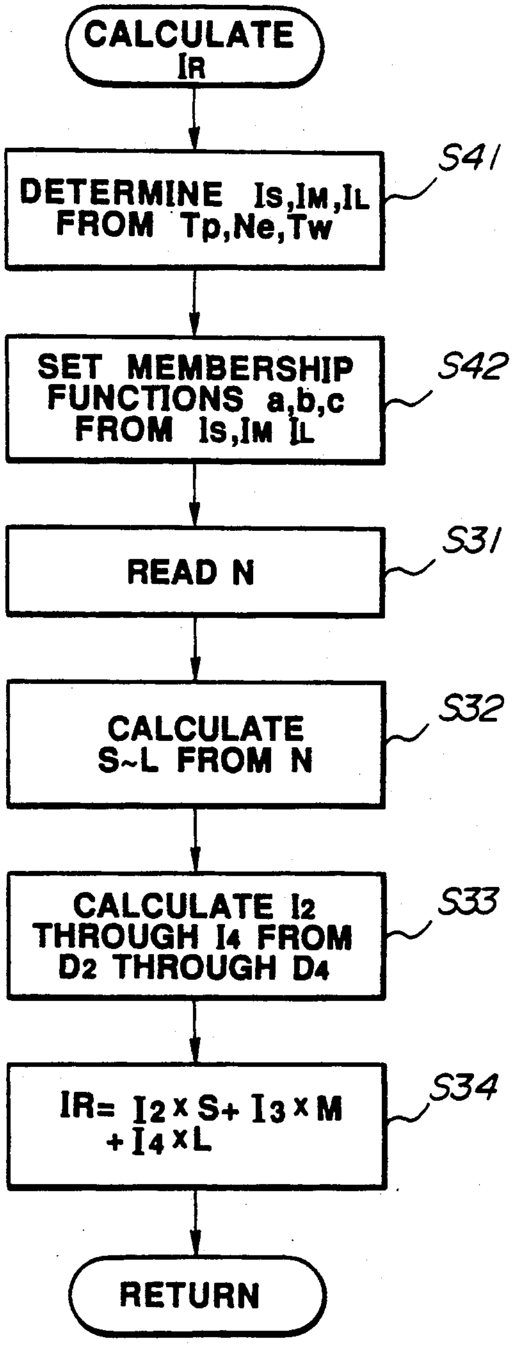
FIG. 20 shows a program flowchart for calculating $I_R$ in a sixth preferred embodiment.

FIG. 20 shows a program flowchart in a sixth preferred embodiment according to the present invention which corresponds to FIG. 19. The calculation of the feedback coefficient in the sixth preferred embodiment is the same as in the fifth preferred embodiment shown in FIG. 13. The hardware structure is the same as in the first preferred embodiment.

In the sixth preferred embodiment, each length of the three membership functions (a, b, and c as described in the fifth preferred embodiment) shown in FIG. 17 ("$l_S$" for the membership function a, "$l_M$" for the membership function b, and "$l_L$" for the membership function c) is changed. In steps S41 and S42 of FIG. 20, each length ($l_S$ through $l_L$) of the membership functions is derived according to the instantaneous engine driving condition and the membership functions (a through c) are set from the respectively derived lengths.

It is noted that the engine driving conditions may include any one of the engine load (,e.g., the basic pulsewidth $T_P$), engine revolutional speed (Ne), or coolant temperature ($T_W$) and/or combinations thereof. The step S41 of FIG. 20 indicates the combination of three parameters, i.e., $T_p$, Ne, and $T_w$.

The above-described lengths ($l_S$ through $l_L$) denote lengths in the horizontal direction of oblique line portions in FIG. 17 in the accurate sense of the word.

For example, the meaning that $l_s$ becomes long is that the oblique portion in the right-down segment of the membership function (a) is translated in the horizontal rightward direction.

The characteristics shown in FIGS. 21 through 24 represent those of one of the lengths, i.e., $l_S$.

Figure 21:
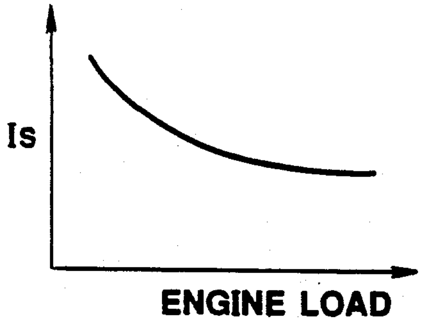
FIGS. 21 through 24 show characteristic graphs for explaining a length ($l_S$) of a membership function a in the sixth preferred embodiment.
Figure 22:
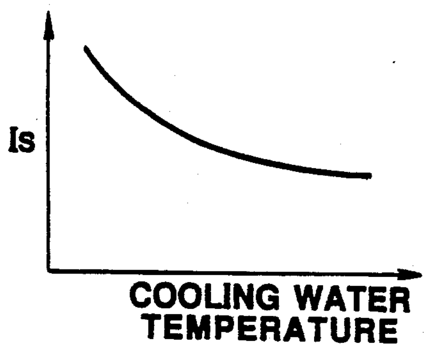

The characteristics of FIGS. 21 and 22 are common to the respectively accumulated parameters after the air/fuel mixture ratio has been inverted.

Figure 23:
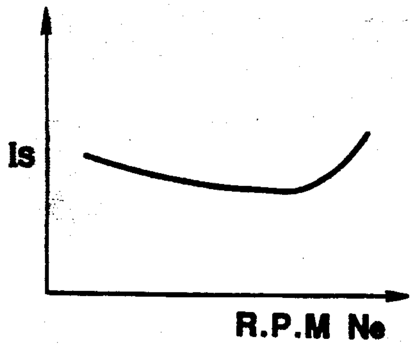

FIG. 23 shows the cases where the accumulated parameter is indicated by the accumulated number of revolutions, accumulated intake air quantity, or accumulated fuel injection quantity.

Figure 24:
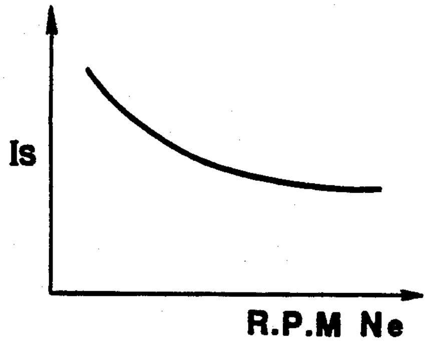

FIG. 24 shows the case where the accumulated parameter is indicated by the accumulated time.

The characteristics of the length $l_S$ shown in FIGS. 21 through 24 are provided with a dead time ($\tau$) largely affecting the accumulated parameters after the inversion of the air/fuel mixture ratio is taken into account. The dead time ($\tau$) in the sixth preferred embodiment is defined in the following equation.

$$\tau=\tau_1+\tau_2+\tau_3+\tau_3+\tau_4+\tau_5 \quad (12)$$

The contents from $\tau_1$ to $\tau_5$ are as follows:

$\tau_1$: a time required for the fuel to be injected through one fuel injection valve to be sucked into the corresponding cylinder.

$\tau_2$: a time of a dead stroke required for suction, compression, explosion, and exhaust strokes.

$\tau_3$: a time delay for the exhaust gas to arrive at the oxygen concentration sensor from the corresponding cylinder (a time delay for the arrival of the exhaust gas at the sensor).

$\tau_4$: a time for the oxygen concentration sensor to respond to output the A/F ratio signal upon arrival of the exhaust gas at the oxygen concentration sensor (sensor response time delay).

$\tau_5$: a time it takes from the receipt of the signal derived from the oxygen concentration sensor by the control unit 40 to perform a calculation process and to inject the fuel through the injection valve (wait time for the calculation process).

The characteristic shown in FIG. 21 is provided with the time delay for the exhaust gas to arrive at the sensor ($\tau_3$) described above taken into account.

The length ($l_s$) corresponds to a time for the A/F ratio to be inverted. As the engine load becomes light, $\tau_3$ becomes correspondingly long and, therefore, $l_S$ needs to be long.

In the same way, the characteristic of FIG. 22 is provided with the above-described $\tau_1$ taken into account. As the coolant temperature becomes low, the atomization of fuel becomes reduced and $\tau_1$ becomes extended. Therefore, the length of $l_s$ becomes correspondingly long.

The characteristic of FIG. 24 is provided with the time of the dead stroke ($\tau_2$) taken into account.

Suppose that the length of $l_S$ becomes assumedly long by 10% with respect to its total length. The change pattern of the membership functions (a through c) will be described in the case where $l_s$ becomes long as described above.

In FIG. 17, an oblique line segment of the membership function (a) which goes right down is translated by 10% from a solid line to a broken line of FIG. 17. On the other hand, both oblique line segments of the membership function (b) which go right down and go left down are translated by 10% in the rightward direction. Since the oblique line segment of the membership function (a) which goes right down is displaced, they are translated in the rightward direction by a total of 20%. In the same way, the oblique line segment of the membership function (c) which goes left down is translated by 30% in the rightward direction. That is to say, the membership functions can be viewed such as to expand or contract in the lateral direction.

The membership functions (a through c) are criteria for determining whether the engine driving condition is "steady state", "transient state", or "transient state end". Therefore, if the membership functions (a through c) change according to the engine driving conditions ($T_p$, $N_e$, $T_w$) and the criteria for the determination according to the instantaneous engine driving condition is prepared, the determination of "steady state", "transient state", or "transient state end" becomes accurate even if the engine driving conditions becomes largely different as in such ways as a low engine load and high engine load, low engine revolutional speed and high engine revolutional speed, or low coolant temperature and high coolant temperature.

Although the membership functions shown in FIG. 17 are one dimensional, they can be set in multi-dimensional form.

Although the fuzzy control is used to derive the integration portions ($I_R$, $I_L$) in the above-described two (fifth and sixth) preferred embodiments, they can be expressed in the form including a proportional portion.

SEVENTH PREFERRED EMBODIMENT

Figure 25:
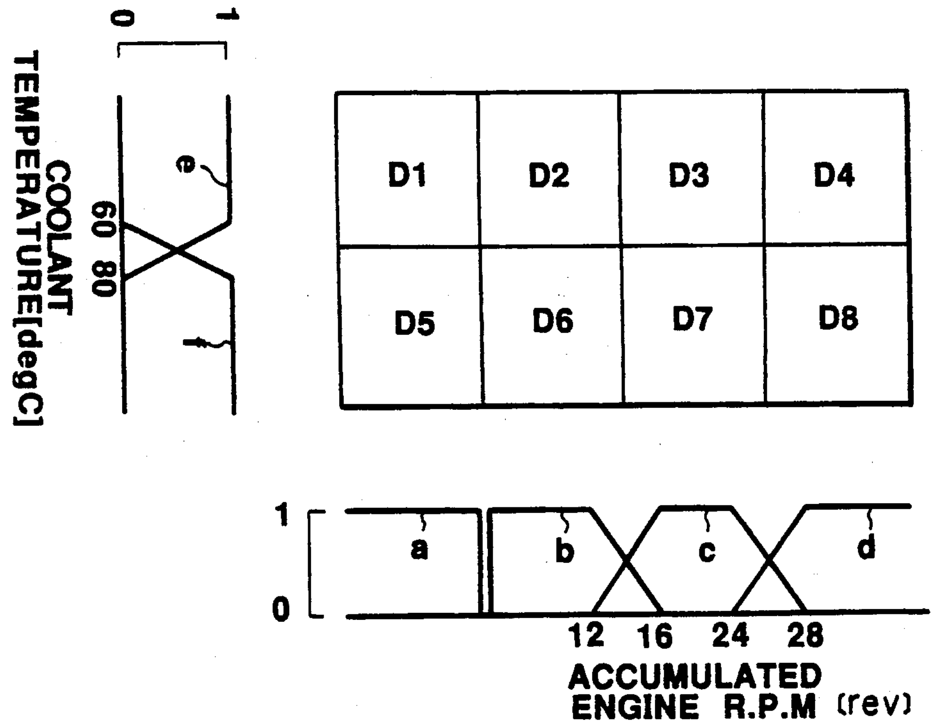
FIG. 25 shows a two-dimensional membership function and corresponding rule table in a seventh preferred embodiment according to the present invention.

FIG. 25 shows the two-dimensional-membership functions and corresponding eight rules in a seventh preferred embodiment.

In FIG. 25, symbols e and f denote membership functions for "the engine coolant is cold" and "the coolant becomes warmed" and symbol d denotes a membership function for the proportional portion (P).

In this case, the integration portion (I) and proportional portion (P) are combined and expressed by $\Delta\alpha$ (including signs of plus and minus).

$$\Delta\alpha = \{((D1) \times J + D2 \times S + D3 \times M + D4 \times L) \times C + (D5 \times J + 0.6 \times S + D8 \times L) \times H\} \times \{J + (1 - J) \times T_p\} \quad (131)$$

In equation (131), D6 through D8 denote integration constants, D6 denotes the integration constant set at a minor value, D7 denotes that set in a major value, and D8 denotes that set in an intermediate value or minor value. D1 and D5 denote proportional constants. J denotes a degree of accommodation derived from the membership function d, and C denotes a degree of accommodation derived from the membership function e, and H denotes a degree of accommodation derived from the membership function f.

FIGS. 17 and 18 show only membership functions (a through c) and corresponding integration constants (D2 through D4) in the sixth preferred embodiment.

For the membership functions e, f for the coolant temperature shown at a left side of FIG. 25, the membership functions for the engine load and engine revolutional speed can be prepared in place of the coolant temperature. Furthermore, if the membership functions for the engine load or the engine revolutional speed are in a direction orthgonal to the paper surface drawing of FIG. 25, three-dimensional membership functions may be prepared.

EIGHTH PREFERRED EMBODIMENT

Figure 26:
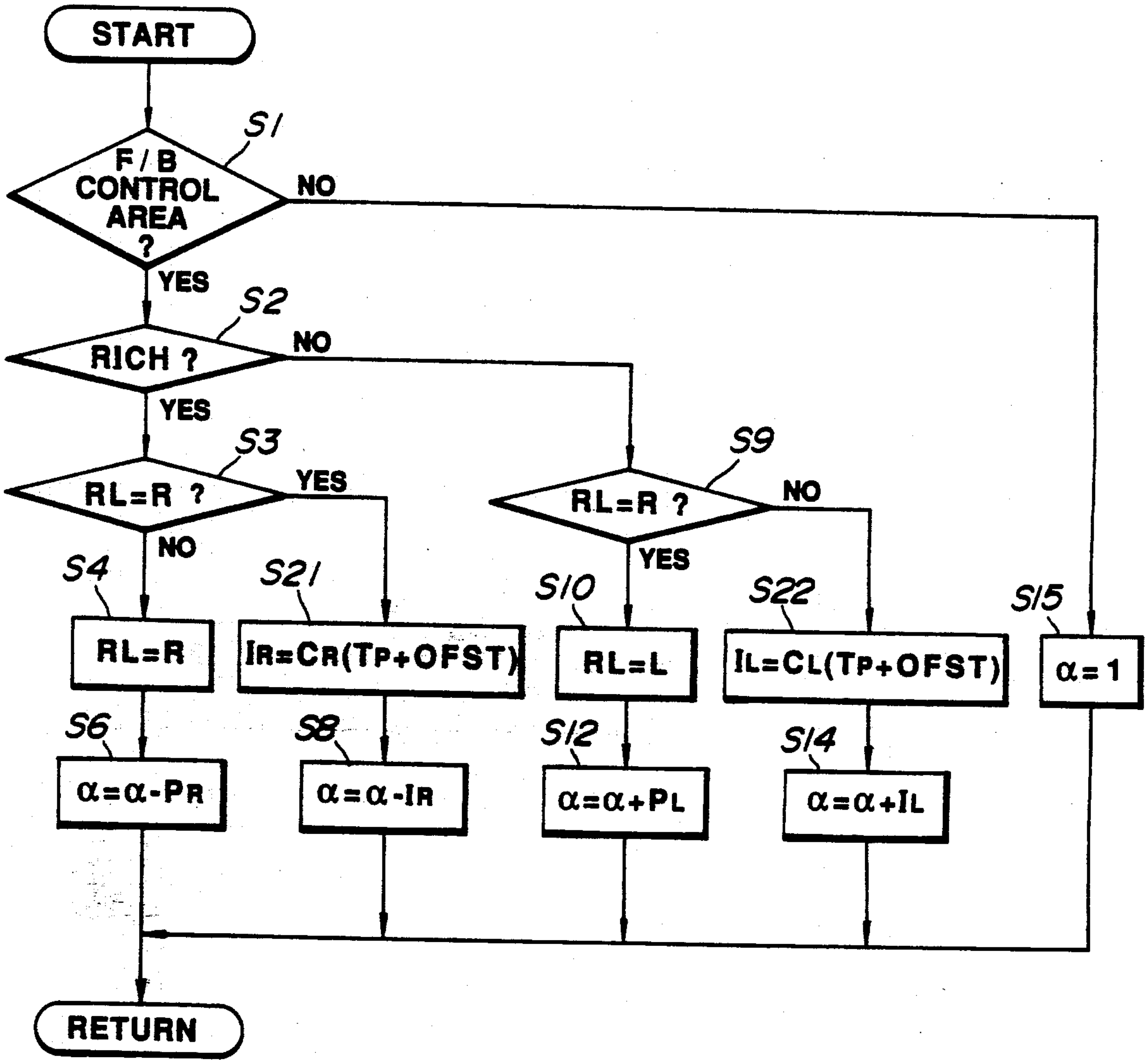
FIG. 26 shows a program flowchart for calculating the feedback correction coefficient in an eighth preferred embodiment according to the present invention.

FIG. 26 shows a program flowchart for explaining the operation of an eighth preferred embodiment of the A/F ratio controlling system.

The same steps in FIG. 26 as those in FIG. 1 correspond to the same contents. The hardware structure is the same as in the first preferred embodiment shown in FIGS. 3 and 4.

The reason that the routine goes to steps S21 or S22 is that the A/F ratio is continued in the rich state or in the lean state. In FIG. 26, each integration portion ($I_R$ or $I_L$) per one control is calculated.

Figure 27:
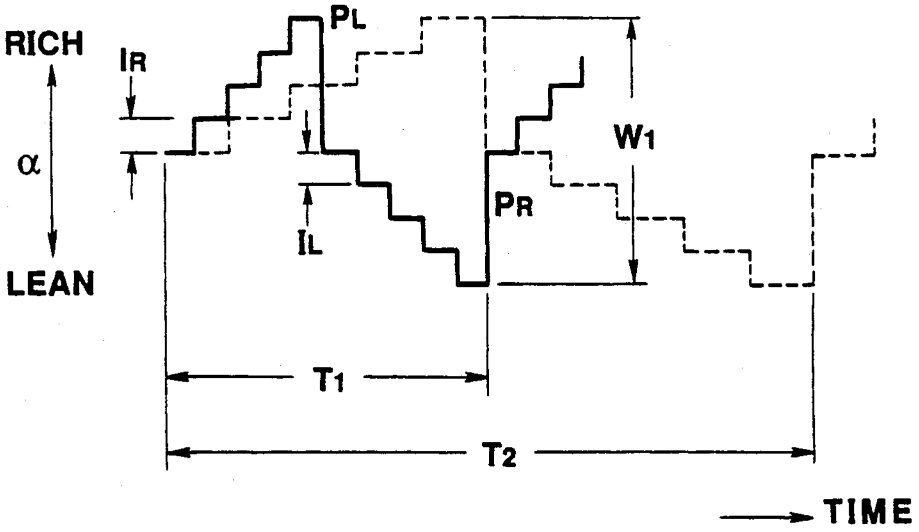
FIGS. 27 and 28 show waveform charts of $\alpha$ for calculating an integration portion for a constant crank angle in engine revolutions.
Figure 28:
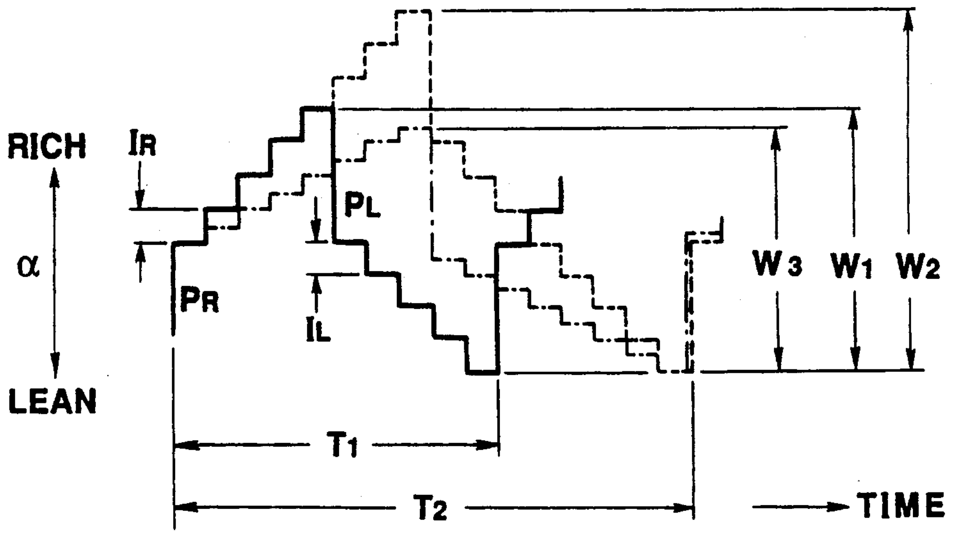

Since the $I_R$ or $I_L$ is derived for a constant crank angle, the waveform of $\alpha$ at that time is given in a step form as denoted by a solid line of FIGS. 27 and 28. In this case, if the engine operates in the steady state (engine load and engine revolutional speed are constant), the lateral width of each step is entirely the same.

Since $I_R$ or $I_L$ calculated from the integration constant $K_I$ (constant value) and the air/fuel mixture ratio difference (ERROR) corresponds to a longitudinal width of each step, the longitudinal width of each step is the same for each.

Influences in a case where a control period of $\alpha$ becomes long for an amplitude of $\alpha$ will be described below.

The case described above is divided into a case where (i) the engine revolutional speed becomes low under the same load and where (ii) the load becomes reduced under the same engine revolutional speed.

The above-described case (i): Since, in this case, a time required to pass a constant angle takes long, a waveform of $\alpha$ is changed from a solid line of FIG. 27 to a broken line of FIG. 28. In other words, the lateral width per one step becomes long but the longitudinal width ($I_R$ and $I_L$) per one step remains unchanged. Therefore, the amplitude of $\alpha$ does not become larger than $W_1$ shown in FIG. 30.

This means that the amplitude of $\alpha$ remains constant unless $I_R$ and $I_L$ are calculated for each constant crank angle irrespective of the high or low rotational speed even if $I_R$ and $I_L$ are calculated.

The above-described case (ii): In this case, the waveform of $\alpha$ is changed from the solid line of FIG. 28 to the broken line of FIG. 28. In other words, although both of the lateral and longitudinal widths per one step do not change, the inversion of the A/F ratio becomes delayed. Therefore, the number of steps are correspondingly increased. The amplitude of $\alpha$ becomes increased from $W_1$ to $W_2$ by the increased number of steps. In order to prevent an increase of the amplitude of $\alpha$ even if the load becomes decreased, the longitudinal width per one step may be reduced as compared with the case of the solid line of FIG. 28.

For example, suppose that the longitudinal width per one step is reduced by ½ as denoted by a dot-and-dash line of FIG. 28, the amplitude of $\alpha$ can be suppressed to $W_3$ of FIG. 28 (substantially equal to $W_1$).

In order to correct the longitudinal width per one step according to the engine load, a correction term for the engine load is inserted as shown in the following equations:

$$I_R = C_R \times T_P \quad (6A)$$

$$I_L = C_L \times T_P \quad (6B)$$

Provided that $T_P$ denotes the basic pulsewidth (equivalent to the engine load) in the equations (6A) and (6B) and $C_R$ and $C_L$ denote constants.

However, in the actual control, the following equations (7A) and (7B) are established with predetermined values (OFST) added.

$$I_R = C_R \times (T_P + OFST) \quad (7A)$$

$$I_L = C_R \times (T_P + OFST) \quad (7B)$$

A load in this case is required which corresponds to the dead time ($\tau$) shown in the following equation.

$$\tau = \tau_1 + \tau_2 + \tau_3 + \tau_4 + \tau_5 \quad (8A)$$

Since, $\tau_3$ in the equation (8A) corresponds chiefly to $T_p$, OFST needs to be incorporated as a value corresponding to the other terms ($\tau_1$, $\tau_2$, $\tau_4$, and $\tau_5$). In a case when the load becomes heavy at the same engine revolutional speed, the above-described equation ($I_R = C_R \times T_P$, $I_L = C_L \times T_p$) is sufficient. In a case where the load becomes light at the same engine revolutional speed, the amplitude of $\alpha$ tends to be too small if only $T_p$ is used and the control becomes unstable. Therefore, the amplitude of $\alpha$ is set to become slightly larger by means of the value OFST within a range corresponding to a window width.

The action of the eighth preferred embodiment shown in FIG. 26 will be described below.

In a case where the engine rotational speed becomes low under the same load, the control-period of $\alpha$ becomes long as in the case from $T_1$ to $T_2$, as shown in FIG. 27. However, in a case where the integration portions ($I_R$ and $I_L$) per one control are calculated for each constant angle, the amplitude of $\alpha$ does not change. In other words, the amplitude of $\alpha$ remains constant irrespective of the high or low engine revolutional speed.

In addition, as the engine load becomes reduced at the same engine revolutional speed, the control period of $\alpha$ becomes long. In this case, since the integration portions ($I_R$ and $I_L$) per one control are reduced as the load becomes reduced, the amplitude of $\alpha$ is held substantially constant in the same way as in the case of the solid line, as shown by a dot-and-dash line of FIG. 28.

Furthermore, in a case where the load becomes light at the same engine revolutional speed, the value of OFST becomes larger relative to the value of $T_P$ and the amplitude of $\alpha$ is set so as to prevent an overreduction thereof.

Consequently, the amplitude of $\alpha$ can be held constant independently of the control period of $\alpha$ which is different according to the engine driving condition and the exhaust emission characteristic at the time of steady state can be improved.

The integration constant ($K_I$) may be derived by means of the fuzzy control using the membership functions and control rule tables.

Figure 29:
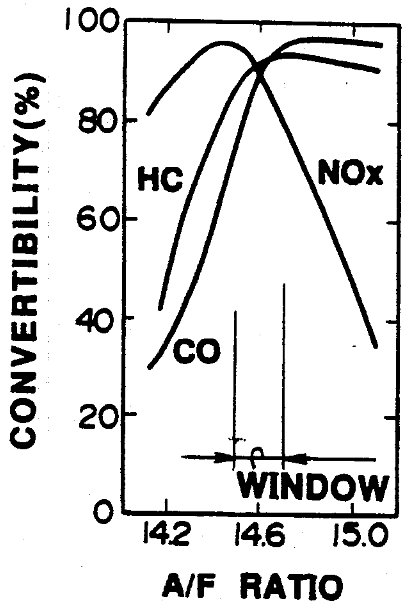
FIG. 29 shows a characteristic graph of three-element catalytic conversion, convertible with respect to the air/fuel mixture ratio.

It is noted that the term window has been described and shown in FIG. 29.

Figure 30:
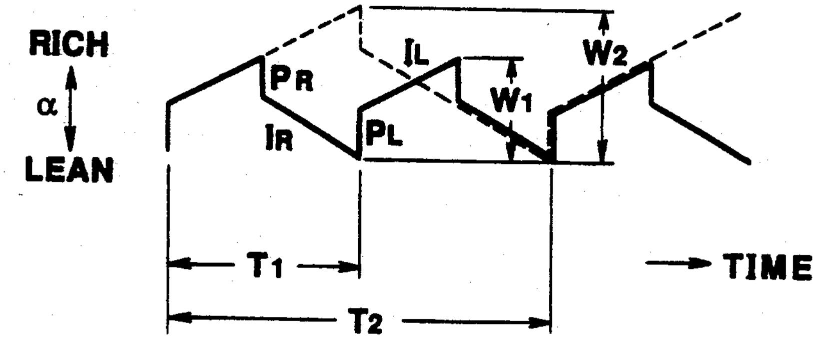
FIG. 30 shows a waveform chart for explaining an operation of a general Proportional-Integral operation control.

FIG. 30 shows the operation of the previously proposed A/F ratio controlling system.

As shown in FIG. 30, when the control period of $\alpha$ becomes longer as shown by $T_2$ from $T_1$ (the waveform of $\alpha$ is changed from the solid line to the broken line), the amplitude of $\alpha$ becomes increased as $W_2$ from $W_1$.

Figure 31:
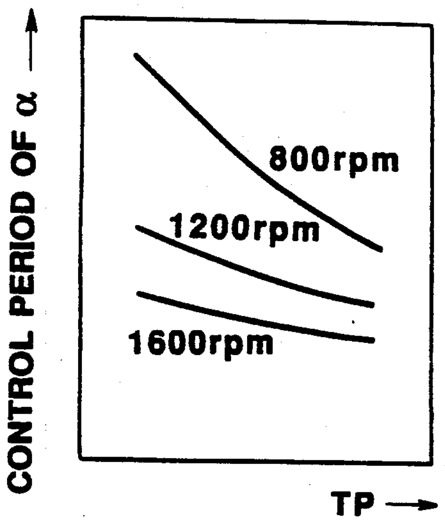
FIG. 31 shows a characteristic graph for explaining a control period of $\alpha$ in the case of the previously proposed air/fuel mixture ratio controlling system.

FIG. 31 shows a relationship between the value of $T_p$ and the control period of $\alpha$ in the case of the previously proposed A/F ratio controlling system.

In the eighth preferred embodiment, the amplitude of $\alpha$ remains substantially constant even if the control period of $\alpha$ changes according to the different engine driving condition.

NINTH PREFERRED EMBODIMENT

Figure 32:
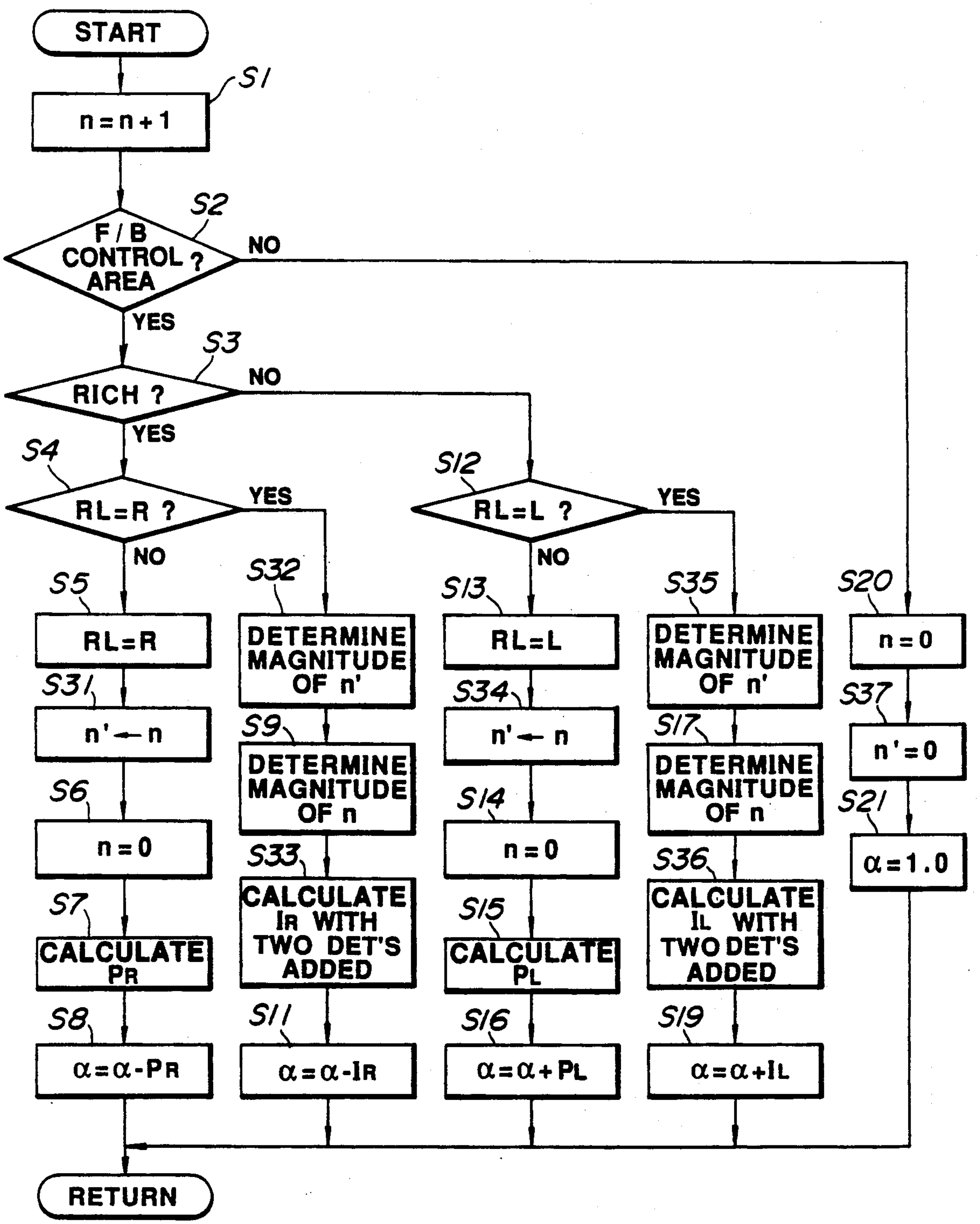
FIG. 32 shows a program flowchart for calculating the feedback correction coefficient in a ninth preferred embodiment.

FIG. 32 shows a program flowchart for deriving the feedback correction coefficient $\alpha$ in a ninth preferred embodiment of the A/F ratio controlling system.

In a step S31 of FIG. 32, the microcomputer moves the value n stored in the memory into another memory as n' before the memory is cleared in the step S6.

In the same way, in a case when the A/F ratio is inverted from the rich state to the lean state, a value stored in the memory of n is moved into the memory as n' in a step S34.

When the value of n' is read in a step S32 or step S35, the read value represents a previous accumulated engine revolutional speed (final value) after the A/F ratio is inverted.

In steps S32 and S35, the CPU 42 determines whether the value of n', i.e., the accumulated engine revolutions after the previous inversion of the A/F ratio is large. If the determination result indicates that it is large, it means that the time for the next inversion of the A/F ratio becomes long, i.e., the required value of $\alpha$ is has greatly deviated from the control center (1, 0) toward the rich side or toward the lean side.

If the required value of $\alpha$ is not so greatly deviated from the control center, the response delay which occurs in the actual $\alpha$ is minor and the harmful exhaust gas does not greatly increase. Therefore, it is sufficient only to deal with a case where the response delay becomes major.

In steps S33 and S36, each of the integration portions is calculated on the basis of the total of two determination results, i.e., the final determination result in the case of the previous inversion of A/F ratio and the present determination result. Since the contents of the steps S33 and S36 are the same, the contents of the step S33 will be described below.

The integration constant ($K_I$) is set using the following table on the basis of each determination result of the steps S32 and S9.

| A | B | $K_I$ |
|---|---|---|
| small or middle | small | small |
| " | middle | large |
| " | large | small |
| large | small | large |
| large | middle | large |
| large | large | small |

A denotes a final determination result at the previous inversion of the A/F ratio.

B denotes the present determination result at the present time.

As can be appreciated from the above-listed table, the integration constant is increased in a case where the final determination result at the previous inversion of the A/F ratio is large and the present determination result is small as is different from the case where the final determination result at the previous inversion indicates small or middle. In this case, the integration constant is changed from the samll value to the large value.

The advent of the final determination result which indicates large at the previous inversion of A/F ratio indicates that the required value of $\alpha$ is greatly deviated from the control center.

In view of the fact that the required value of $\alpha$ immediately after the required value $\alpha$ is greatly deviated from the control center is returned to the control center, the time delay can correspondingly be reduced since the large integration portion can follow returning to the control center.

When the integration constant $K_I$ is defined as shown in the above-listed table, the integration portion $I_R$ is calculated as a quantity to gradually reduce the value of the previously derived feedback correction coefficient $\alpha$ $$I_R = K_I \times (T_P + OFST) \quad (1B)$$

In the equation (1B), $T_P$ is determined from the parameters of the engine load and engine revolutional speed as described above and the equation (1B) can be used with the coolant temperature taken into account, in the same way as described in the previous embodiments.

Figure 33:
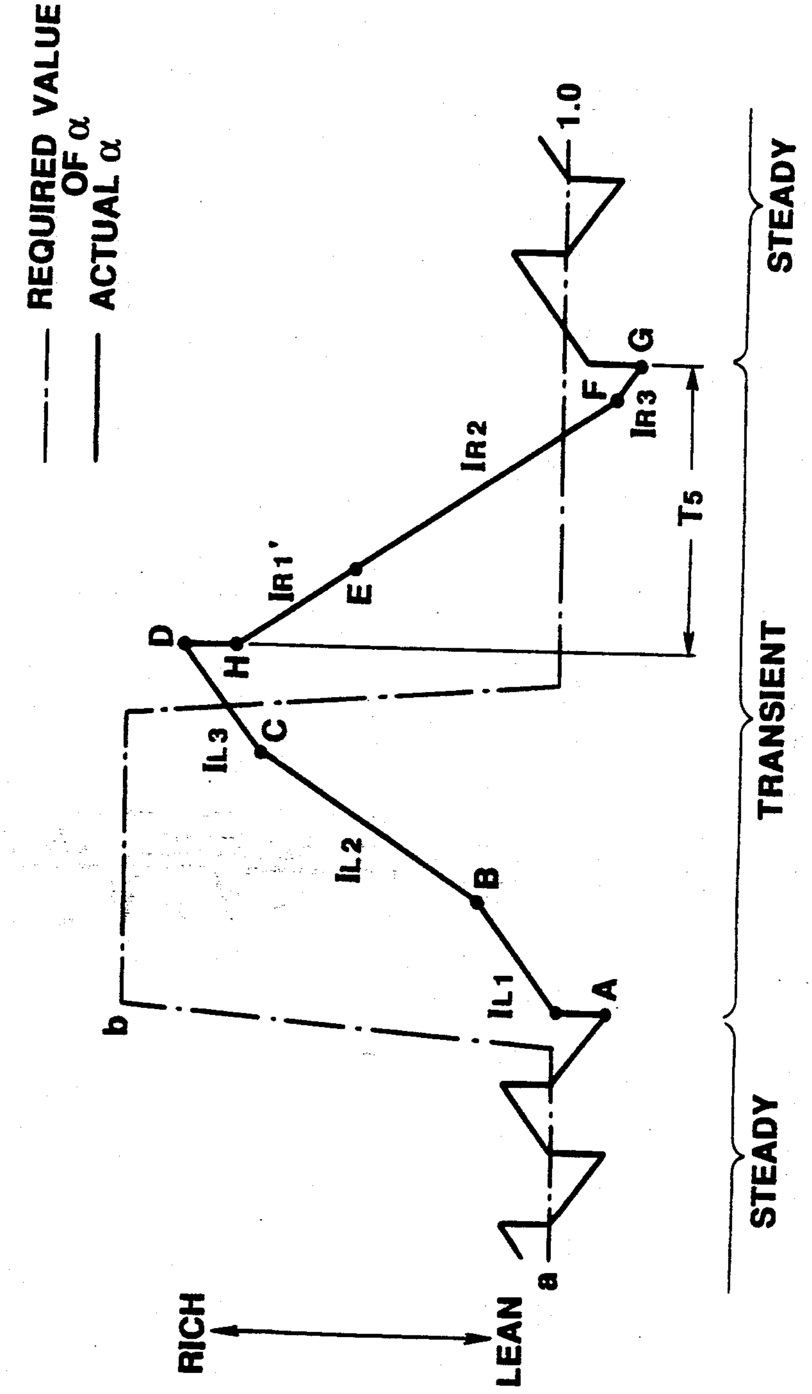
FIG. 33 shows a waveform chart for explaining the operation in the ninth preferred embodiment.

FIG. 33 shows an explanatory view for explaining an operation in the ninth preferred embodiment.

FIG. 33 indicates a change of waveform of the value of $\alpha$ when the engine operates in the steady and transient states.

When the required value of $\alpha$ becomes extremely rich, in FIG. 33, the value moved into the memory as n' at a time D (a final measured value of the accumulated engine revolutions after the previous inversion of the A/F ratio) becomes large. Therefore, when the CPU 42 determines that the advent of a large value is observed when the previous inversion with the value of n' occurs at a time H, the integration portion ($|I_R|$) having the large gradient immediately apears at the time H. In other words, when the large value appears at the previous inversion, the integration portion acted upon the time immediately after the present inversion occurs is set to have a larger gradient that the early one.

Thus, the interval during which the actual $\alpha$ (denoted by the solid line of FIG. 33) is returned to the control center becomes short toward $T_5$ which is shorter than that in the case of the previously proposed A/F ratio controlling system.

In other words, in a case where the large value exits in the final determination result at the previous inversion, the CPU 42 determines that $\alpha$ has greatly deviated from the control center and increases the responsive characteristic of $\alpha$ at the process in which $\alpha$ is returned to the control center. Consequently, since the quantity of harmful exhaust gas components can be reduced by a quantity corresponding to a speed at which the value of $\alpha$ is quickly returned to the control center, the total quantity of the harmful exhaust gas components at a time when the engine speed is reduced and again increased, when the engine is accelerated and then decelerated, and when the engine speed change is repeated can be substantially suppressed.

TENTH PREFERRED EMBODIMENT

In a tenth preferred embodiment, the procedures in the steps S32, S9, and S33 of FIG. 32 or in the steps S35, S17, and S36 of FIG. 32 (the calculations of integration portions based on the final determination at the previous inversion, the present determination, and their determination results) are carried out by means of fuzzy control.

Figure 34:
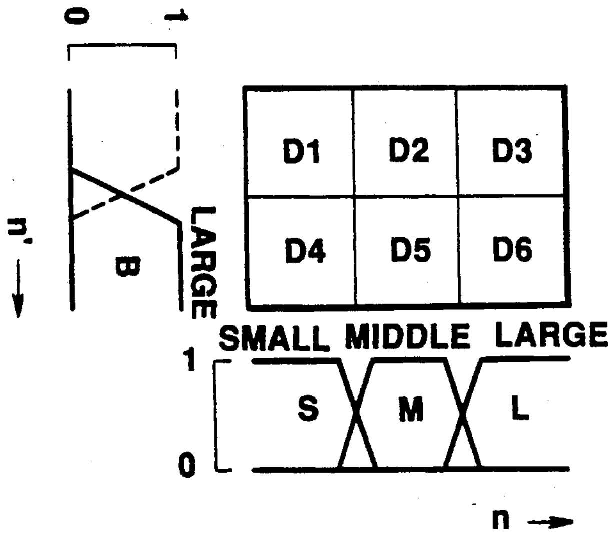
FIG. 34 shows an explanatory view of membership functions in a case of the ninth preferred embodiment.

FIG. 34 shows the two-dimensional membership functions and rule tables in the tenth preferred embodiment.

(A) Preparation of the control rules:

(1) Definition of the fuzzy set; The membership function is located at a longitudinal position at a left side of FIG. 34. The above-described membership function is provided as the continuous value in the trapezoidal form in the same way as the other three membership functions located at the lower stage of FIG. 34.

For the membership function placed at the longitudinal direction, it is provided only in a case where the value of n' (final measured value of the accumulated revolutions after the previous inversion of the A/F ratio) is large. This is because when the fact that a total sum of a grade (B') derived from the membership function for the "not large" and a grade (B) derived from the membership function for the "large" is 1 (=B'+B) is utilized, B' is derived by subtracting B from 1. At this time, the value of n' does not prepare the membership function for the "not large" as denoted by a broken line of FIG. 34.

(2) Preparation of the control rules:

In this case, the number of rules are six as the total since the membership function is two dimensional.

The rules can be expressed as follows:

Rule 1: If "the final measured value at the previous inversion indicates small or middle and that at the present invention indicates small", then "D1".

Rule 2: If "the final measured value at the previous inversion indicates small or middle and that at the present inversion indicates middle", then "D2".

Rule 3: If "the final measured value at the previous inversion indicates small or middle and that at the present inversion of A/F ratio indicates large", then "D3".

Rule 4: If "the final measured value at the previous inversion indicates large and that at the present inversion indicates small", then "D4".

Rule 5: If "the final measured value at the previous inversion indicates large and that at the present inversion indicates middle", then "D5".

Rule 6: If "the final measured value at the previous inversion indicates large and that at the present inversion indicates large", then "D6".

It is noted that D4 through D6 denote the integration constants in the same way as D1 through D3.

The following relationships are present: D4=D5=D2 and D6=D3.

In the tenth preferred embodiment, in a case where in the Rule 4, the final determination result at the previous inversion of the A/F ratio indicates large and the present result of determination indicates small, the integration constant becomes large.

(B) Execution method:

The integration portion ($I_R$ or $I_L$) is derived as a weight mean through the grades for small, middle, and large. For example, for $I_R$, $$I_R=[(D1\times S+D2\times M+D3\times l)\times(1-B)+(D4\times S+D5\times M+D6\times L)\times B]\times(T_P+OFST) \quad (2B),$$

wherein B denotes the grade for the membership function located at the longitudinal direction of FIG. 34.

In the tenth preferred embodiment, the large integration constant is used when the final determination result at the previous inversion of A/F ratio indicates large and the present result of determination indicates small. The harmful exhaust gas emission at the time of the engine driving area in which the acceleration and deceleration are repeated can be substantially suppressed.

As described hereinabove, the A/F ratio controlling system and method according to the present invention, the most appropriate integration constant can be achieved which simultaneously meets the requirements of stablity at the steady state and of preferable responsive characteristic at the transient state.

It is noted that the word "reversal" used in the drawings is equivalent to the word "inversion" used in the specification.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for controlling an air/fuel mixture ratio for an internal combustion engine, comprising:

a) first means for detecting engine driving conditions;

b) second means for calculating a basic fuel supply quantity to said engine on the basis of said detected engine driving conditions;

c) third means for detecting an actual air/fuel mixture ratio of the engine to produce a detected air/fuel mixture ratio;

d) fourth means for measuring a deviation of said detected air/fuel mixture ratio from a target air/fuel mixture ratio;

e) fifth means for determining whether there is an inversion of a relationship of magnitudes of both said target air/fuel mixture ratio;

f) sixth means for measuring an accumulated parameter of an engine operation after said inversion of said relationship of said the air/fuel mixture ratios whenever said fifth means determines that said relationship of said magnitudes of both said air/fuel mixture ratios has been inverted;

g) seventh means for setting a criterion to be compared with said measured accumulated parameter;

h) eighth means for comparing said measured accumulated parameter with said criterion and setting an integration constant which satisfies both a requirement of stability at a time of an engine steady driving condition and a requirement of a preferable responsive characteristic at a time of an engine transient driving condition on the basis of a result of comparison;

i) ninth means for calculating an integration portion from said set integration constant and measured deviation and calculating a feedback correction quantity of air/fuel mixture ratio including at least said integration portion; and j) tenth means for correcting said basic fuel supply quantity with said feedback correction quantity to determine a fuel supply quantity for said engine.

2. A system as set forth in claim 1, wherein said accumulated parameter measured by said sixty means comprises a lapse time after said relationship in said air/fuel mixture ratio has been inverted and wherein said seventh means sets a predetermined time duration.

3. A system as set forth in claim 2, wherein the eighth means sets the integration constant on the basis of the lapse time so that the integration constant becomes minor until the predetermined time duration is passed and thereafter becomes major.

4. A system as set forth in claim 1, wherein said accumulated parameter measured by said sixth means comprises a number of engine revolutions after said relationship in said air/fuel mixture ratio has been inverted and wherein said seventh means sets a predetermined number of engine revolutions.

5. A system as set forth in claim 4, wherein the eighth means sets the integration constant on the basis of the measured number of engine revolutions so that the integration constant becomes minor until the predetermined number of engine revolutions has been rotated and thereafter becomes major.

6. A system as set forth in claim 1, wherein said accumulated parameter measured by said sixth means comprises an accumulated quantity of intake air sucked into said engine after said relationship in said air/fuel mixture ratio has been inverted and wherein said seventh means sets a predetermined accumulated number of intake air quantity.

7. A system as set forth in claim 4, wherein the eighth means sets the integration constant so that the integration constant becomes minor until the predetermined number of intake air quantity has been passed and thereafter becomes major.

8. A system as set forth in claim 1, wherein said accumulated parameter measured by said sixth means comprises an accumulated quantity of fuel supplied into the engine after the relationship in the air/fuel mixture ratio has been inverted and wherein the seventh means sets a predetermined accumulated quantity of fuel supplied into the engine.

9. A system as set forth in claim 8, wherein the eighth means sets the integration constant so that the integration constant becomes major until the quantity of fuel supplied into the engine after the relationship has been inverted exceeds the predetermined accumulated quantity of fuel and thereafter becomes middle or minor.

10. A system as set forth in claim 1, wherein the seventh means sets the criterion on the basis of the measured parameter such that the engine driving condition falls in a steady state, in a transient state, or in a transient end state.

11. A system as set forth in claim 10, wherein the eighth means sets the integration constant so that the integration constant becomes minor during the steady driving condition, becomes major during the transient driving condition, and becomes minor or middle during the transient end driving condition.

12. A system as set forth in claim 1, wherein the ninth means calculates the integration portion whenever the engine has rotated through a constant crank angle using the integration constant and deviation.

13. A system as set forth in claim 12, which further includes an eleventh means for adding the basic fuel supply quantity and a predetermined value and for correcting the integration constant according to the addition result.

14. A system as set forth in claim 1, wherein the eighth means sets the integration constant so that the integration constant becomes minor when the compared result indicates that the measured parameter is smaller than the criterion, becomes major when the compared result indicates that the measured parameter is middle as compared with the criterion, and becomes again minor when the measured parameter indicates that the measured parameter is larger than the criterion.

15. A system as set forth in claim 1, wherein the third means includes a wide-range air/fuel mixture ratio sensor for detecting the air/fuel mixture ratio from the exhaust gas component derived from the engine.

16. A system as set forth in claim 1, wherein the fuel supply quantity is indicated by a pulsewidth of each fuel injection signal outputted to each fuel injection valve installed in an intake manifold of the engine.

17. A system as set forth in claim 1, wherein the target air/fuel mixture ratio is a stoichiometric air/fuel mixture ratio.

18. A system for controlling an air/fuel mixture ratio for an internal combustion engine, comprising:

a) first means for detecting engine driving conditions;
b) second means for calculating a basic fuel supply quantity to said engine on the basis of said detected engine driving condition;
c) third means for detecting an actual air/fuel mixture ratio of said engine;
d) fourth means for measuring a deviation of said detected air/fuel mixture ratio from a target air/fuel mixture ratio;
e) fifth means for determining whether there is inversion of a relationship of magnitudes of both said detected air/fuel mixture ratio and said target air/fuel mixture ratio with respect to said target air/fuel mixture ratio;
f) sixth means for measuring an accumulated engine driving parameter after said inversion of said relationship in said air/fuel mixture ratio whenever said fifth means determines that said relationship of said magnitudes of both said air/fuel mixture ratios has been inverted;
g) seventh means for setting and varying an integration constant according to said engine driving conditions after said inversion of said relationship in said air/fuel mixture ratio, said integration constant satisfying both requirements of stability at a time of an engine steady driving condition and of a preferable responsive characteristic at a time of an engine transient driving condition on the basis of said measured accumulated driving parameter;
h) eighth means for calculating an integration portion from said set integration constant and measured deviation and calculating a feedback correction quantity of air/fuel mixture ratio including at least said integration portion; and,
i) ninth means for correcting said basic fuel supply quantity with said feedback correction quantity to determine a fuel supply quantity to said engine.

19. A system as set forth in claim 18, wherein the feedback correction quantity ($\alpha$) changes periodically and is operated in a proportional-integration operation mode and the integration portion ($I_R$, $I_L$) and a proportional portion ($P_R$, $P_L$) are calculated as follows:

$$P_R = K_P \times \text{ERROR},$$

$$[\Sigma I_R = \Sigma I_R + K_I \times \text{ERROR},]\Sigma I_R = K_I \times \text{ERROR},$$

$P_L = K_P \times ERROR,$ and $[\Sigma I_L = \Sigma I_L \times ERROR,] \Sigma I_L = K_I \times ERROR$ wherein $P_R$ denotes a first proportional portion when the air/fuel mixture ratio is continued in a rich side, $K_P$ denotes a proportional constant, $K_I$ denotes the integration constant, $P_L$ denotes a second proportional portion when the air/fuel mixture ratio is continued in a lean side, $I_R$ denotes a first integration portion when the air/fuel mixture is continued in a lean side, $I_L$ denotes a second integration portion when the air/fuel mixture ratio is continued in the lean side.

20. A system as set forth in claim 19, wherein the first integration portion ($I_R$) is calculated so as to be relatively small until a first predetermined time ($T_1$) has passed after the relationship in the air/fuel mixture ratio is inverted into the rich side, so as to be relatively large until a second predetermined time ($T_2$) has passed after the first predetermined time ($T_1$), and so as to be smaller than that for the second predetermined time ($T_2$) after the second predetermined time ($T_2$) has passed.

21. A system as set forth in claim 19, wherein the second integration portion ($I_L$) is calculated so as to be relatively small until a first predetermined time ($T_1$) has passed after the relationship in the air/fuel mixture ratio is inverted into the lean side, so as to be relatively large until a second predetermined time ($T_2$) has passed after the first predetermined time ($T_1$), and so as to be smaller than that for the second predetermined time ($T_2$) after the second predetermined time ($T_2$) has passed.

22. A system as set forth in claim 19, wherein the first integration portion ($I_R$) is calculated according to an accumulated number of engine revolutions after the relationship in the air/fuel mixture ratio is inverted into the rich side and the second integration portion ($I_L$) is calculated according to the accumulated number of engine revolutions after the relationship in the air/fuel mixture ratio is inverted into the lean side.

23. A system as set forth in claim 19, wherein the first integration portion ($I_R$) is calculated according to an accumulated intake air quantity after the relationship in the air/fuel mixture ratio is inverted into the rich side and the second integration portion ($I_L$) is calculated according to the accumulated intake air quantity after the relationship in the air/fuel mixture ratio is inverted into the lean side.

24. A system as set forth in claim 19, wherein the first integration portion ($I_R$) is calculated according to an accumulated fuel injection quantity after the relationship in the air/fuel mixture ratio is inverted into the rich side and the second integration portion ($I_L$) is calculated according to the accumulated fuel injection quantity after the relationship in the air/fuel mixture ratio is inverted into the lean side.

25. A system as set forth in claim 18, wherein the seventh means determines whether the engine driving condition falls in a steady state, in a transient state, or in a transient end state on the basis of the measured parameter and sets and varies the integration constant on the basis of the determination result such that a relatively small integration constant (D2) is set when the engine driving condition falls in the steady state, a relatively large integration constant (D3) is set when the engine driving condition falls in the transient state, and a relatively small or middle integration constant (D4) is set when the engine driving condition falls in the transient end state.

26. A system as set forth in claim 25, wherein the seventh means sets and varies the integration constant utilizing one-dimensional membership functions and control rules in a fuzzy set.

27. A system as set forth in claim 25, wherein the integration portion ($I_2$ through $I_4$) at each of the engine driving conditions is calculated as follows:

$I_2$ (steady state) $= D2 \times T_P$ (or ERROR), $I_3$ (transient state) $= D3 \times T_P$ (or ERROR), and $I_4$ (transient end state) $= D4 \times T_P$ (or ERROR), wherein $T_P$ denotes the basic fuel injection quantity and ERROR denotes the deviation of the air/fuel mixture ratio from the target air/fuel mixture ratio and the integration portion ($I_R$) when the relationship in the air/fuel mixture ratio has been inverted into the rich side is calculated as an operating variable in a fuzzy control as follows:

$$I_R = (D2 \times S + D3 \times M + D4 \times L) \times T_P,$$

wherein S, M, and L denote degrees of accommodations at the respective driving state in each control rule in the fuzzy control.

28. A system as set forth in claim 26, wherein the seventh means sets and varies the integration constant utilizing two-dimensional membership functions and control rules in a fuzzy set.

29. A system as set forth in claim 26, wherein the seventh means sets and varies the integration constant utilizing three-dimensional membership functions and control rules in a fuzzy set.

30. A system as set forth in claim 18, wherein the eighth means calculates the integration portion whenever the engine has rotated through a constant crank angle, which further includes tenth means for adding a predetermined value (OFST), and wherein the integration constant used for the setting of the integration portion is corrected according to the added result of the tenth means so that an amplitude of the feedback correction quantity (α) remains substantially constant irrespective of a control period of the feedback correction quantity.

31. A system as set forth in claim 18, which further includes: a) tenth means for setting a criterion to be compared with the measured parameter; and b) eleventh means for comparing the measured parameter with the criterion and determining whether the measured parameter indicates small, large, and middle as compared with the criterion, and wherein the seventh means sets the integration constant ($I_R$ or $I_L$) such that a relatively small constant is set when the determination result indicates small, a relatively large integration constant is set when the determination result indicates middle, and a relatively small integration constant is again set when the determination result indicates large.

32. A system as set forth in claim 31, which further includes: c) thirteenth means for storing a final result of the determination by the eleventh means when the relationship in the air/fuel mixture has previously been inverted; d) fourteenth means for determining whether the final result indicates large and the present determination result indicates small; and e) fifteenth means for changing the integration constant to the large integration constant when the fourteenth means determines that the final result indicates large and the present determination result indicates small.

33. A system as set forth in claim 32, wherein the calculation of the integration portion is carried out on the basis of the determination result of the fourteenth means using a fuzzy control procedure.

34. A system as set forth in claim 33, wherein the integration portion is calculated as follows:

$$I_R=\{(D1\times S+D2\times M+D3\times L)\times(1-B)+(D4\times S+D5\times M+D6\times L)\times B\}\times(T_P+OFST),$$

wherein OFST denotes the predetermined value, D1 through D6 denote integration constants determined depending the determination result of the fourteenth means, S, M, L denotes grades for the small, middle, and large, and B denotes a grade for a membership function for "it is large".

35. A method for controlling an air/fuel mixture ratio for an internal combustion engine, comprising:

a) detecting engine driving conditions;

b) calculating a basic fuel supply quantity to said engine on the basis of said detected engine driving conditions;

c) detecting an actual air/fuel mixture ratio of said engine;

d) measuring a deviation of said detected air/fuel mixture ratio from a target air/fuel mixture ratio;

e) determining whether a relationship of magnitudes of both said detected air/fuel mixture ratio and target air/fuel mixture ratio is inverted with respect to said target air/fuel mixture ratio;

f) measuring at least one accumulated engine driving parameter after inversion of said relationship of said air/fuel mixture ratio whenever determining that said relationship of the magnitudes of both air/fuel mixture ratios has been inverted;

g) setting and varying an integration constant according to said engine driving conditions after said inversion of said integration constant satisfying both requirements of stability at a time of an engine steady driving condition and of a preferable responsive characteristic at a time of an engine transient driving condition on the basis of said measured accumulated engine driving parameter;

h) calculating an integration portion from said set integration constant and measured deviation and calculating a feedback correction quantity of air/fuel mixture ratio including at least said integration portion;

and, i) correcting said basic fuel supply quantity with said feedback correction quantity to determine a fuel supply quantity to said engine.

36. A method as set forth in claim 35, which further includes the step of injecting fuel through each of injection valves installed in the engine according to the corrected fuel supply quantity in the step i).

* * * * *